US009711057B2

(12) United States Patent
Mayumi et al.

(10) Patent No.: US 9,711,057 B2
(45) Date of Patent: Jul. 18, 2017

(54) QUESTION SETTING APPARATUS AND METHOD

(71) Applicant: FUJITSU LIMITED, Kawasaki-shi, Kanagawa (JP)

(72) Inventors: Hidehiko Mayumi, Kawasaki (JP); Toshio Tanaka, Yokohama (JP); Takeaki Kobayashi, Yokohama (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 14/035,490

(22) Filed: Sep. 24, 2013

(65) Prior Publication Data

US 2014/0024006 A1 Jan. 23, 2014

Related U.S. Application Data

(63) Continuation of application No. PCT/JP2011/058085, filed on Mar. 30, 2011.

(51) Int. Cl.
*G09B 7/00* (2006.01)
*G09B 7/073* (2006.01)
*G06Q 10/10* (2012.01)

(52) U.S. Cl.
CPC ............... *G09B 7/00* (2013.01); *G06Q 10/10* (2013.01); *G09B 7/073* (2013.01)

(58) Field of Classification Search
USPC ................................ 434/322, 323, 350, 365
See application file for complete search history.

(56) References Cited

U.S. PATENT DOCUMENTS

2007/0122788 A1 * 5/2007 Stevens .................... G09B 7/00 434/323
2008/0038708 A1 * 2/2008 Slivka ...................... G09B 7/08 434/350

(Continued)

FOREIGN PATENT DOCUMENTS

JP 7-210074 8/1995
JP 2003-91231 3/2003

(Continued)

OTHER PUBLICATIONS

Patent Abstracts of Japan, Publication No. 2005-070465, Published Mar. 17, 2005.

(Continued)

*Primary Examiner* — Kesha Frisby
(74) *Attorney, Agent, or Firm* — Staas & Halsey LLP

(57) ABSTRACT

A question setting apparatus is disclosed, including a processor and a storage part. The storage stores problem information which maintains problem data including a problem and a correct answer of the problem included in a test sent to students, and student answer information which maintains answer data and a correct/incorrect answer determination result for each of the students. The processor processes test operations of referring to the problem information, sending the problem data to the student terminals, receiving the answer data from the student terminals in a given time for the test, and recording the answer data in the student answer information. The processor processes a progress display. A progress state is displayed in the given time and indicates an answer state of the problem data based on the correct/incorrect answer determination result. A display instruction is sent to the student terminals to stop the test.

6 Claims, 23 Drawing Sheets

(56) References Cited

U.S. PATENT DOCUMENTS

| | | | | |
|---|---|---|---|---|
| 2009/0035733 A1* | 2/2009 | Meitar | G09B 7/00 434/118 |
| 2012/0208164 A1* | 8/2012 | Hoda | G09B 7/04 434/350 |

FOREIGN PATENT DOCUMENTS

| | | |
|---|---|---|
| JP | 2003-255818 | 9/2003 |
| JP | 2005-70465 | 3/2005 |
| JP | 2007-248773 | 9/2007 |
| JP | 2010-262248 | 11/2010 |
| WO | WO 03/050782 A1 | 6/2003 |

OTHER PUBLICATIONS

Patent Abstracts of Japan, Publication No. 2003-091231, Published Mar. 28, 2003.
Patent Abstracts of Japan, Publication No. 2010-262248, Published Nov. 18, 2010.
Patent Abstracts of Japan, Publication No. 2003-255818, Published Sep. 10, 2003.
Patent Abstracts of Japan, Publication No. 07-210074, Published Aug. 11, 1995.
Patent Abstracts of Japan, Publication No. 2007-248773, Published Sep. 27, 2007.
Intenational Search Report mailed May 10, 2011 in corresponding International Application No. PCT/JP2011/058085.

* cited by examiner

FIG.4

31 STUDENT DB

| STUDENT ID | PASSWORD | STUDENT NAME |
| --- | --- | --- |
| 1001 | sjhgpeut87 | TARO AOKI |
| 1002 | Kuu862nkk | JIRO AOSHIMA |
| 1003 | 984nfkihb | SABURO AOTA |
| 1004 | k3754h5nkl | ICHIRO AOYAMA |
| ... | ... | ... |

FIG.5

32 DRILL DB

| PROBLEM ID | PROBLEM TEXT | OPTION_1 | OPTION_2 | OPTION_3 | OPTION_4 | CORRECT ANSWER |
|---|---|---|---|---|---|---|
| 11 | WHEN WAS THE KAMAKURA SHOGUNATE FOUNDED ? | 1182 | 1192 | 1197 | 1199 | 2 |
| 12 | WHO FOUNDED THE KAMAKURA SHOGUNATE ? | YOSHITUNE MINAMOTO | SADAIE MINAMOTO | YOSHITOMO MINAMOTO | YORITOMO MINAMOTO | 4 |
| 13 | WHAT WAS PLACE, WHICH WAS ARRANGED BY THE KAMAKURA SHOGUNATE, CALLED TO RECEIVE COMPLAINTS ? | COURTHOUSE | COMPLAINING PLACE | HIGH COURT | ORDERING PLACE | 3 |
| 14 | WHICH REBELLION DID EMPEROR GOTOBA CAUSE TO SUBDUE THE SHOUGUNATE ? | ONIN WAR | BATTLE OF SEKIGAHARA | GOTOBA REBELLION | JOKYU REBELLION | 4 |

FIG.6

33 DRILL START TIME TABLE

| DRILL START TIME | |
|---|---|
| DATE (YYYY/MM/DD) | START TIME |
| 2010/1/31 | 10:00:05 |

FIG.7

34 STUDENT ANSWER DB

| STUDENT ID | PROBLEM ID | ANSWER | CORRECT /INCORRECT ANSWER | ANSWER TIME (MIN) |
|---|---|---|---|---|
| 1001 | 11 | 2 | ○ | 4 |
| | 12 | 3 | × | 4 |
| | 13 | 4 | × | 5 |
| | 14 | | | 1 |
| | 15 | 2 | ○ | 1 |
| 1002 | 11 | | | 3 |
| | 12 | 3 | × | 3 |
| | 13 | | | 4 |
| | 14 | 2 | ○ | 3 |
| | 15 | 1 | × | 1 |
| … | … | … | … | … |

FIG.8

35 WARNING-OF ANSWER TIME DB

| PROBLEM ID | WARNING-OF ANSWER TIME (MIN) |
|---|---|
| 11 | MORE THAN OR EQUAL TO 3 |
| 12 | MORE THAN OR EQUAL TO 3 |
| 13 | MORE THAN OR EQUAL TO 5 |
| 14 | MORE THAN OR EQUAL TO 5 |
| ... | ... |

FIG.9

36 WARNING-OF CORRECT ANSWER PERCENTAGE DB

| PROBLEM ID | WARNING-OF CORRECT ANSWER PERCENTAGE |
|---|---|
| 11 | LESS THAN OR EQUAL TO 20% |
| 12 | LESS THAN OR EQUAL TO 30% |
| 13 | LESS THAN OR EQUAL TO 30% |
| 14 | LESS THAN OR EQUAL TO 20% |
| ... | ... |

FIG.10

37 WARNING CONDITION DB

| PROBLEM ID | WARNING CONDITION | |
|---|---|---|
| | WARNING-OF ANSWER TIME (MIN) | WARNING-OF CORRECT ANSWER PERCENTAGE |
| 11 | MORE THAN OR EQUAL TO 2 | LESS THAN OR EQUAL TO 25% |
| 12 | MORE THAN OR EQUAL TO 2 | LESS THAN OR EQUAL TO 35% |
| 13 | MORE THAN OR EQUAL TO 4 | LESS THAN OR EQUAL TO 35% |
| 14 | MORE THAN OR EQUAL TO 4 | LESS THAN OR EQUAL TO 25% |
| ... | ... | ... |

FIG.11

38 ANSWER PERCENTAGE THRESHOLD TABLE

| | |
|---|---|
| ANSWER PERCENTAGE THRESHOLD | 60% |

FIG.12

39 CONDITION MATCHING TABLE

| | |
|---|---|
| CONDITION MATCHING PERCENTAGE | 50% |

FIG.13

61 RECEIVED PROBLEM TABLE

| PROBLEM ID | PROBLEM TEXT | OPTION_1 | OPTION_2 | OPTION_3 | OPTION_4 |
|---|---|---|---|---|---|
| 11 | WHEN WAS THE KAMAKURA SHOGUNATE FOUNDED ? | 1182 | 1192 | 1197 | 1199 |
| 12 | WHO FOUNDED THE KAMAKURA SHOGUNATE ? | YOSHITUNE MINAMOTO | SADAIE MINAMOTO | YOSHITOMO MINAMOTO | YORITOMO MINAMOTO |
| 13 | WHAT WAS PLACE, WHICH WAS ARRANGED BY THE KAMAKURA SHOGUNATE, CALLED TO RECEIVE COMPLAINTS ? | COURTHOUSE | COMPLAINING PLACE | HIGH COURT | ORDERING PLACE |
| 14 | WHICH REBELLION DID EMPEROR GOTOBA CAUSE TO SUBDUE THE SHOUGUNATE ? | ONIN WAR | BATTLE OF SEKIGAHARA | GOTOBA REBELLION | JOKYU REBELLION |
| 16 | ... | ... | ... | ... | ... |

FIG.14

62 ANSWER TABLE

| PROBLEM ID | ANSWER |
|---|---|
| 11 | 2 |
| 12 | 3 |
| 13 | 4 |
| 14 | |
| 15 | 2 |
| 16 | 4 |

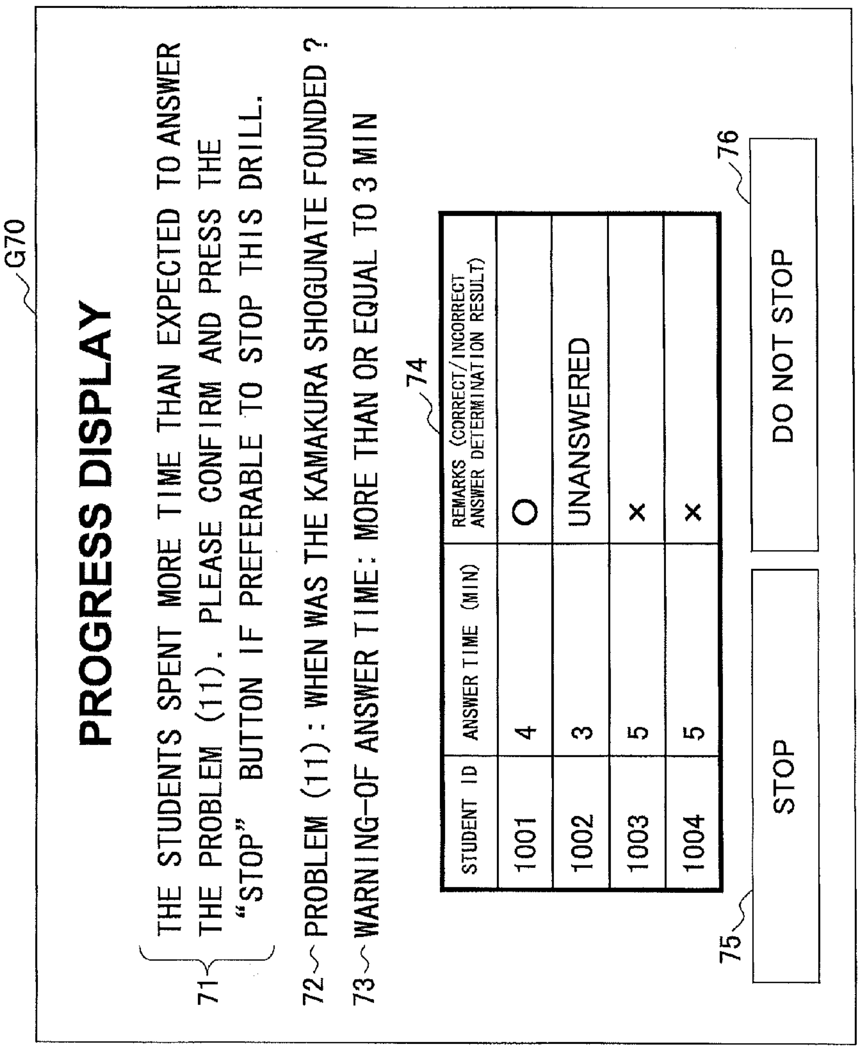

FIG.23

PROGRESS DISPLAY

71 { THE STUDENTS SPENT MORE TIME THAN EXPECTED TO ANSWER THE PROBLEM (11). PLEASE CONFIRM AND PRESS THE "STOP" BUTTON IF PREFERABLE TO STOP THIS DRILL.

72 ~ PROBLEM (11) : WHEN WAS THE KAMAKURA SHOGUNATE FOUNDED ?
73 ~ WARNING-OF ANSWER TIME : MORE THAN OR EQUAL TO 3 MIN

| STUDENT ID | ANSWER TIME (MIN) | REMARKS (CORRECT/INCORRECT ANSWER DETERMINATION RESULT) |
|---|---|---|
| 1001 | 4 | ○ |
| 1002 | 3 | UNANSWERED |
| 1003 | 5 | × |
| 1004 | 5 | × |

STOP | DO NOT STOP

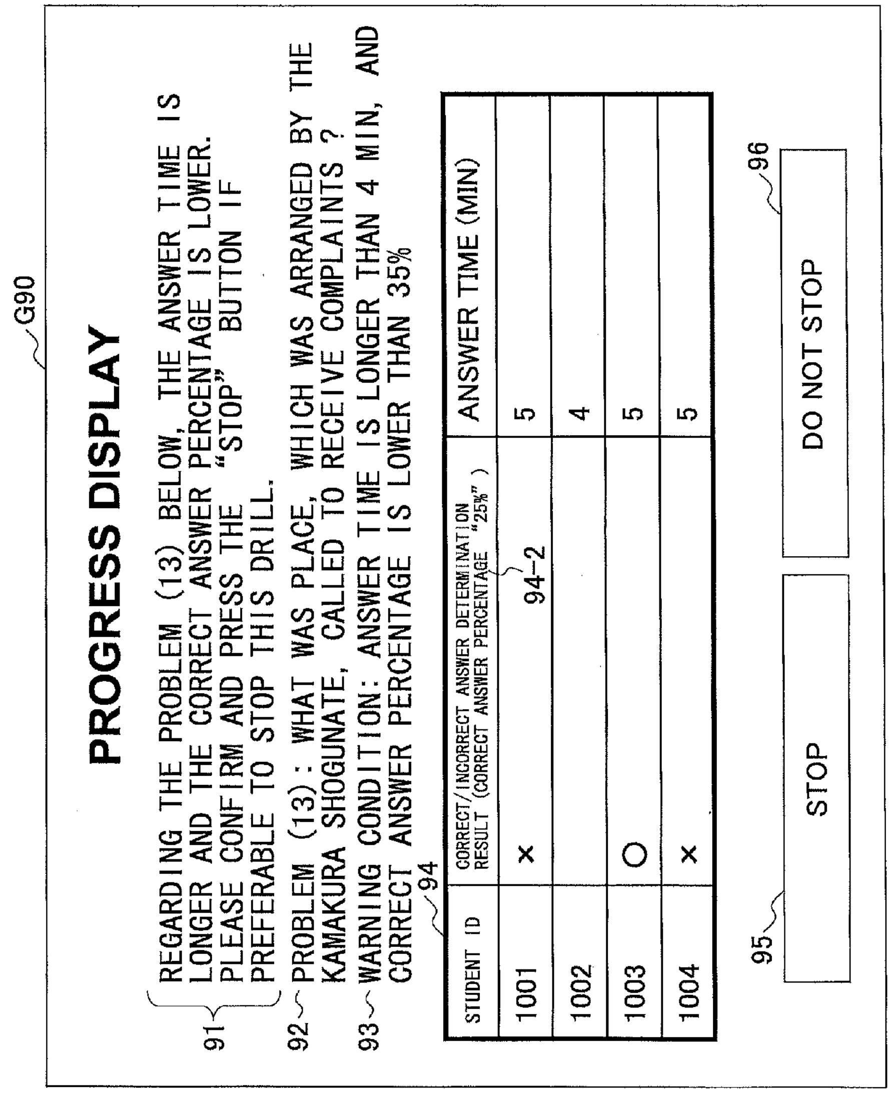

FIG.25

PROGRESS DISPLAY

*G90*

91 — REGARDING THE PROBLEM (13) BELOW, THE ANSWER TIME IS LONGER AND THE CORRECT ANSWER PERCENTAGE IS LOWER. PLEASE CONFIRM AND PRESS THE "STOP" BUTTON IF PREFERABLE TO STOP THIS DRILL.

92 — PROBLEM (13) : WHAT WAS PLACE, WHICH WAS ARRANGED BY THE KAMAKURA SHOGUNATE, CALLED TO RECEIVE COMPLAINTS ?

93 — WARNING CONDITION: ANSWER TIME IS LONGER THAN 4 MIN, AND CORRECT ANSWER PERCENTAGE IS LOWER THAN 35%

94

| STUDENT ID | CORRECT/INCORRECT ANSWER DETERMINATION RESULT (CORRECT ANSWER PERCENTAGE "25%") | ANSWER TIME (MIN) |
|---|---|---|
| 1001 | × | 5 |
| 1002 |  | 4 |
| 1003 | ○ | 5 |
| 1004 | × | 5 |

94-2

95 STOP    96 DO NOT STOP

QUESTION SETTING APPARATUS AND METHOD

CROSS-REFERENCE TO RELATED APPLICATION

This application is a continuation of International Application PCT/JP2011/058085 filed on Mar. 30, 2011 and designated in the U.S., the entire contents of which are incorporated herein by reference.

FIELD

The present invention is related to a question setting apparatus and method for sending a problem to student terminals and collecting answers of students from the student terminals through a network.

BACKGROUND

Recently, in Japan, information terminals have been installed and an empirical experiment has begun at public elementary schools. All elementary and junior high schools are scheduled to distribute digital textbooks. In the future, it is considered possible for a next generation education system using mobile information terminals to pervade nationwide. Conventionally, it is possible to send a problem to a learner and to present a next problem in response to the ability of the learner based on a mark result, through a network.

As a learning system, a technology is known in which an answer result of a learner is received, and patterns of incorrectly answered problems, and other problems which took more than a standard time to acquire a correct answer, are viewable as a learning result, so that a teacher and parents are able to recognize a weak point of the learner.

PATENT DOCUMENTS

Patent Document 1: Japanese Laid-open Patent Publication No. 2005-070465

SUMMARY

According to one aspect of an embodiment, there is provided a question setting apparatus, including a processor; and a storage to store problem information which maintains problem data including a problem and a correct answer of the problem, the problem included in a specific test sent to multiple student terminals; and student answer information which maintains answer data and a correct/incorrect answer determination result for each of the multiple students, the answer data indicating an answer of a student for the problem, wherein the processor performs a process including processing test operations of referring to the problem information; sending the problem data to the multiple student terminals connected through a network; receiving the answer data from multiple student terminals in a given time for the test; and recording the answer data in the student answer information; and processing a progress display by displaying a progress state at a display device in the given time by using the student answer information, the progress state indicating an answer state of the problem data based on the correct/incorrect answer determination result for the answer data, which are received from the multiple student terminals; and sending a display instruction, which is input based on the progress state being displayed and causes the specific test to stop, to the multiple student terminals.

According to other aspects of the embodiment, there may be provided a question setting method, and a non-transitory computer-readable recording medium to cause a computer to function as the above described apparatus.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 4 is a diagram illustrating a data configuration example of a student DB of the teacher terminal;

FIG. 5 is a diagram illustrating a data configuration example of a drill DB of the teacher terminal;

FIG. 6 is a data structure example of a drill start time table of the teacher terminal;

FIG. 7 is a diagram illustrating a data structure example of a student answer DB of the teacher terminal;

FIG. 8 is a diagram illustrating a data structure example of a warning-of answer time DB of the teacher terminal;

FIG. 9 is a diagram illustrating a data structure example of a warning-of correct answer percentage DB of the teacher terminal;

FIG. 10 is a diagram illustrating a data structure example of a warning condition DB of the teacher terminal;

FIG. 11 is a diagram illustrating a data structure example of a answer percentage threshold table of the teacher terminal;

FIG. 12 is a diagram illustrating a data structure example of a condition matching table of the teacher terminal;

FIG. 13 is a diagram illustrating a data configuration example of a received problem table of the student terminal;

FIG. 14 is a diagram illustrating a data configuration example of an answer table of the student terminal;

FIG. 23 is a diagram illustrating a progress display screen displayed in step S137 in FIG. 21;

FIG. 25 is a diagram illustrating an example of the progress display screen displayed in step S144 in FIG. 22.

DESCRIPTION OF EMBODIMENT

By using the related art, it becomes possible to determine an ability of a learner and to provide information so that the learner is able to understand a problem for which the learner incorrectly answered, based on a test result after an end of the test. In the related art, the information is provided after the end of the test.

However, there are various types of tests including a test which is not formal or real. Informal tests may include a test such as a drill (so-called exercise) which is given daily to students in a class. It is assumed that the drill corresponds to a test in a type of conducting multiple problems related to specific matters. Accordingly, if the drill is stopped in a middle of the test, it is not always needed to perform problems which are not conducted.

In a case of a drill type test as described above, instead of expecting accuracy of a correct answer percentage of the students, emphasis is placed on helping the students understand learning content. Accordingly, even during the test, the teacher may need to see an answer state of the students and to give advice to the students.

The teacher needs to determine whether a reason why the students incorrectly answer and a reason why the students take time to answer are lack of comprehension by the students or nonconformity between class content and problem content because of an insufficient explanation in a class. The teacher needs to change a responding method depending on the reason. If the reason is lack of comprehension of the students, it may be preferable that the teacher let the students spend the entire test time to obtain an answer. On the other hand, if the reason is insufficient explanation in the class, it may be preferable that the teacher follows up the insufficient explanation to give a supplemental explanation to the students as early as possible.

If the teacher supplementarily explains in an insufficient matter in a class time, extra time may be needed to explain content which is not originally expected in the class time. In this case, the teacher may not be able to proceed with a lesson to finish the learning content which has been originally scheduled. In a class operation, it may be a problem how to assure time for the supplemental explanation, without omitting or reducing the learning content originally scheduled as much as possible.

In the following, an embodiment of the present invention will be described with reference to the accompanying drawings. In a system according to the embodiment, regarding a problem (a drill or the like) to confirm the comprehension of the class content of the students performed within time of each class, it is possible to support the teacher during the test to comprehend a state which is considered as being caused by the insufficient explanation of the teacher at a class, and to promptly explain the problem at that instant.

Figure 1:
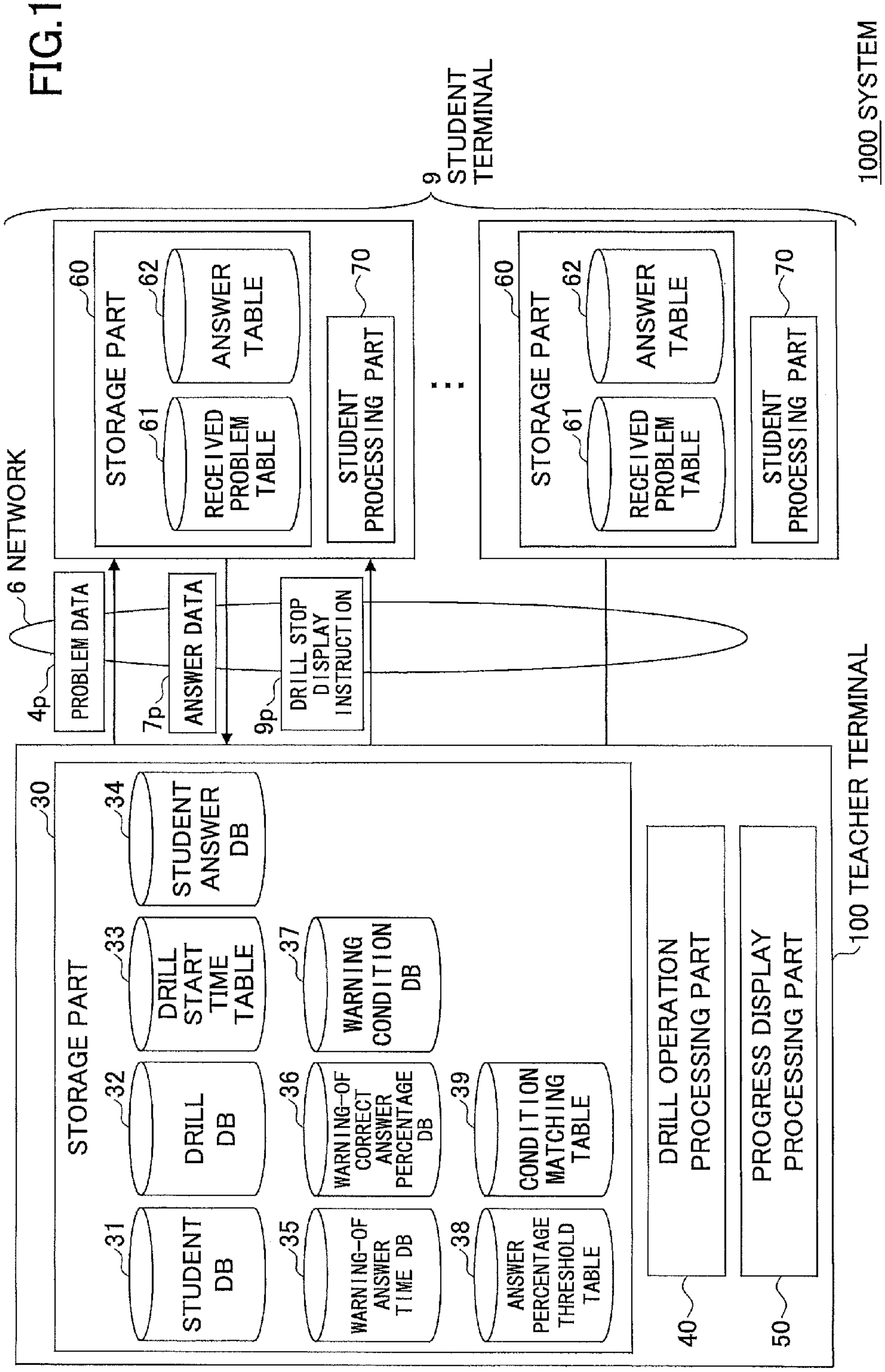
FIG. 1 is a diagram illustrating a system configuration example according to an embodiment.

FIG. 1 is a diagram illustrating a system configuration example according to the embodiment. A system 1000 illustrated in FIG. 1 includes a teacher terminal 100, and multiple student terminals 9. The teacher terminal 100 is connected to the multiple student terminals 9 through a network 6. The system 1000 illustrated in FIG. 1 is regarded as a system which is installed for each of classes, sends the drill to the multiple student terminals 9 in a class, and collects answers of the students from the multiple student terminals 9, in an educational institution.

The embodiment is not limited to an installation for each of the classes. A server corresponding to the teacher terminal 100 may be installed outside a class room, and may manage the drill to be sent to the multiple student terminals 9 for each of the classes. In this case, multiple teacher terminals 100 used by teachers and the multiple student terminals 9 used by multiple students for whom respective teachers are responsible are connected to the server through the network 6 to form the system 1000.

The teacher terminal 100 is used by the teacher, and includes a drill operation processing part 40, and a progress display processing part 50. Also, in a storage part 30, the teacher terminal stores a student DataBase (DB) 31, a drill DB 32, a drill start time table 33, a student answer DB 34, a warning-of answer time DB 35, a warning-of correct answer percentage DB 36, a warning condition DB 37, an answer percentage threshold table 38, a condition matching table 39, and the like. The databases 31, 32, and 34 to 37, and tables 33, 38, and 39 will be described later.

The teacher terminal 100 is regarded as a question setting apparatus which sends the problem to the student terminals 9 and collects answers of the students from the student terminals 9. Also, the teacher terminal 100 monitors the answer state of the students, and determines whether the answer state is due to the insufficient explanation in the class, based on a right answer percentage of the problem in the test being currently progressed, a percentage in which an answer time of the problem exceeds a given time. When it is determined that the answer state is due to the insufficient explanation of the class, the teacher terminal 100 being the question setting apparatus displays a progress state to report it to the teacher.

In the embodiment, a drill stop corresponds to stopping of the drill before a time limit (the given time) of the drill occurs. A drill end corresponds to ending of the drill when the time limit of the drill occurs.

The drill operation processing part 40 is regarded as a processing part which sends problem data 4*p* including the problem, options, and a correct answer from the drill DB 32 to the student terminals 9 of authenticated students, receives answer data 7*p* including an answer and an answer time of a student from each of the student terminals 9, and records the answer data 7*p* in the student answer DB 34.

The progress display processing part 50 is regarded as a processing part which displays progress of the drill based on percentage of students who exceed the answer time which is acquired by using the student answer DB 34, and/or the correct answer percentage. Also, when the teacher terminal 100 receives a drill stop instruction from the teacher, the progress display processing part 50 sends a drill stop display instruction 9*p* for displaying a drill stop instruction to the student terminals 9 to inform the students of a stop of the drill. A message indicating the stop of the drill is displayed at the student terminal 9. Then, the teacher explains the problem for which the drill is stopped.

The progress display processing part 50 appropriately uses the warning-of answer time DB 35, the warning-of correct answer percentage DB 36, the warning condition DB 37, the answer percentage threshold table 38, and the condition matching table 39, in order to determine whether to stop the drill.

The student DB 31 is regarded as a database to maintain authentication information for each of the students. The drill DB 32 is a regarded as a database to maintain the problems and correct answers. The problem data 4*p* are stored in the drill DB 32. The drill start time table 33 is used for the drill operation processing part 40 to record current data and time when the drill is started. The student answer DB 34 is regarded as a database to maintain each of the problems and each of the answers for each of the students. The answer data 7*p* are maintained in the student answer DB 34.

The warning-of answer time DB 35 is regarded as a database to maintain a warning-of answer time used to determine whether the students spend more time so as to stop the drill, for each of the problems. The warning-of correct answer percentage DB 36 is regarded as a database to maintain the warning-of correct answer percentage which is used to determine whether to stop the drill and explain the problem, which is difficult for the students to correctly answer based on contents of the classes which the students previously participated. The warning condition DB 37 is regarded as a database to maintain a warning condition based on a combination of the warning-of answer time and the warning-of correct answer percentage, for each of the problems.

The answer percentage threshold table 38 is used to maintain a threshold of the answer percentage in order for the progress display processing part 50 to conduct a progress display process. The condition matching table 39 is used to maintain a condition to perform a progress display.

The student terminal 9 is used by a student, and includes a student processing part 70. Also, the student terminal 9 stores a received problem table 61 and an answer table 62 in the storage part 60. Each of the tables 61 and 62 will be described later.

The student processing part 70 is regarded as a processing part which receives the problem data 4*p* after the authentication of the student, measures the answer time spent for each of the problems, and sends the answer data 7*p* including the answer and the answer time of the student to the teacher terminal 100. Also, when the student terminal 9 receives the drill stop display instruction 9*p* from the teacher terminal 100, the student terminal 9 displays a message of the drill stop.

The teacher is able to stop the drill depending on the progress state of the drill of the student, and to complementally explain the problem which was not sufficiently explained in a previous class, by using time for the drill. Accordingly, it is possible to prevent using time for a subsequent lesson for the problem which was not sufficiently explained.

The received problem table 61 is used to maintain the problem data 4*p* received from the teacher terminal 100. The answer table 62 is used to maintain the answer selected by the student. The answer for each of problems is sent by the answer data 7*p* to the teacher terminal 100.

Figure 2:
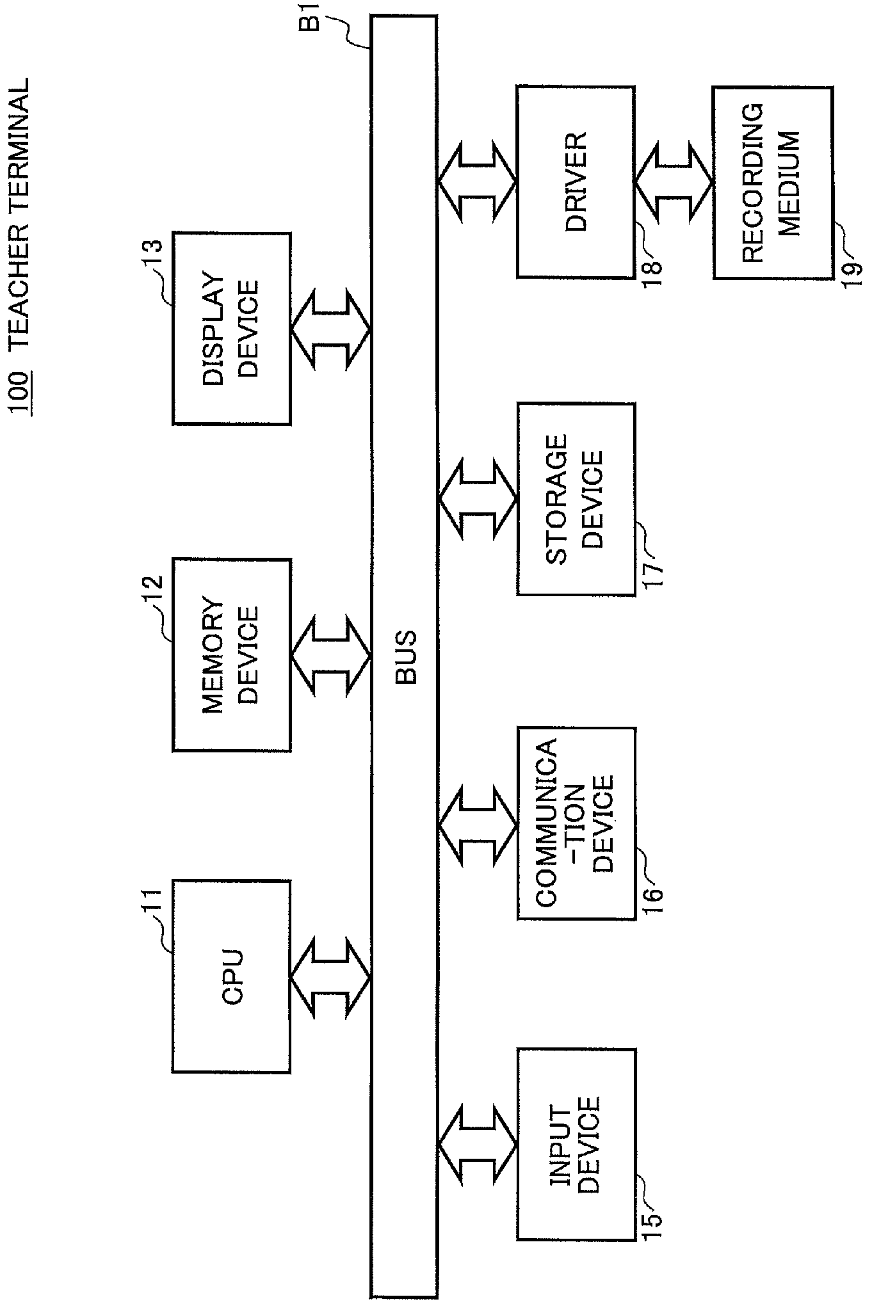
FIG. 2 is a diagram illustrating a hardware configuration of a teacher terminal.

FIG. 2 is a diagram illustrating a hardware configuration of the teacher terminal 100. In FIG. 2, the teacher terminal 100 is controlled by a computer. The teacher terminal 100 includes a Central Processing Unit (CPU) 11, a memory device 12, a display device 13, an input device 15, a communication device 16, a storage device 17, and a driver 18, which are mutually connected through a bus B1.

The CPU 11 controls the teacher terminal 100 in accordance with a program stored in the memory device 12. The memory device 12 may include a Random Access Memory (RAM), a Read-Only Memory (ROM), and the like. The memory device 12 stores the program to be executed by the CPU 11, data for a process conducted by the CPU 11, data acquired in the process, and the like. Also, a part of an area of the memory device 12 is allocated as a working area which is used in the processes conducted by the CPU 11.

The display device 13 displays various information items for control by the CPU 11. The input device 15 may include a mouse, a keyboard, and the like, and is used by the teacher to input the various information items for the process conducted by the teacher terminal 100. The communication device 16 is regarded as a device which connects to the network 6 such as a Local Area Network (LAN) or the Internet and communicates with each of the student terminals 9.

The storage device 17 may include a hard disk unit, and stores data such as programs for conducting various processes and the like. A part of the memory device 12 and/or the storage device 17 corresponds to the storage part 30 illustrated in FIG. 1.

The program realizing the process which is conducted by the teacher terminal 100 may be provided to the teacher terminal 100 by a recording medium 19 such as a Compact Disc Read-Only Memory (CD-ROM) and the like. The recording medium 19 may be formed by a non-transitory (or tangible) computer-readable recording medium. When the recording medium 19 storing the program is set into the driver 18, the driver 18 reads out the program from the recording medium 19, and the program being read out is installed into the storage device 17 through the bus B1. When the CPU 11 is instructed to execute the program, the CPU 11 starts the process in accordance with the program installed into the storage device 17. A recording medium is not limited to the CD-ROM to store the program. The recording medium 19 may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

The drill operation processing part 40, the progress display processing part 50, the student DB 31, the drill DB 32, the drill start time table 33, the student answer DB 34, the warning-of answer time DB 35, the warning-of correct answer percentage DB 36, the warning condition DB 37, the answer percentage threshold table 38, and the condition matching table 39, which are illustrated in FIG. 1, are realized by processes performed by the CPU 11 which executes the installed program pertinent to the teacher terminal 100.

Figure 3:
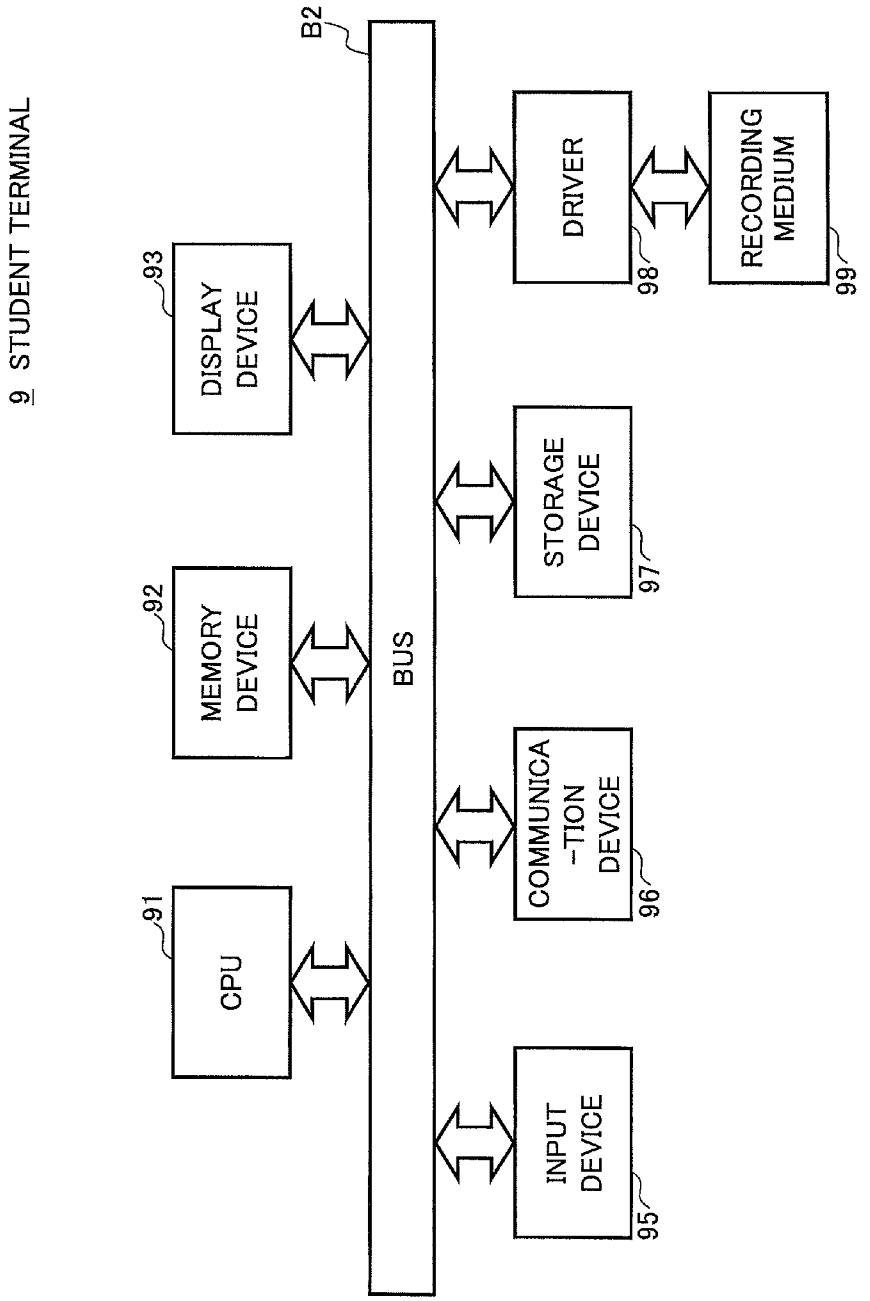
FIG. 3 is a diagram illustrating a hardware configuration of a student terminal.

FIG. 3 is a diagram illustrating a hardware configuration of the student terminal 9. In FIG. 3, the student terminal 9 is controlled by a computer, and includes a Central Processing Unit (CPU) 91, a memory device 92, a display device 93, an input device 95, a communication device 96, a storage device 97, and a driver 98, which are mutually connected via a bus B2.

The CPU 91 controls the student terminal 9 in accordance with a program stored in the memory device 92. The memory device 92 may include a Random Access Memory (RAM), a Read-Only Memory (ROM), and the like. The memory device 92 stores the program to be executed by the CPU 91, data for a process conducted by the CPU 91, data acquired in the process, and the like. Also, a part of an area of the memory device 92 is allocated as a working area which is used in the process conducted by the CPU 91.

The display device 93 displays various information items for control by the CPU 91. The input device 95 may include a mouse, a keyboard, and the like, and is used for the teacher to input the various information items for the process conducted by the student terminal 9. The communication device 96 is regarded as a device which connects to the network 6 such as a Local Area Network (LAN) or the Internet and communicates with each of the teacher terminals 100.

The storage device 97 may include a hard disk unit, and stores data such as programs for conducting various processes and the like. A part of the memory device 92 and/or the storage device 97 corresponds to the storage part 60 illustrated in FIG. 1.

The program realizing the process which is conducted by the student terminal 9 may be provided to the student terminal 9 by a recording medium 99 such as a Compact Disc Read-Only Memory (CD-ROM) or the like. The recording medium 99 may be formed by a non-transitory (or tangible) computer-readable recording medium. When the recording medium 99 storing the program is set into the driver 98, the driver 98 reads out the program from the recording medium 99, and the program being read out is installed into the storage device 97 through the bus B2. When the CPU 91 is instructed to execute the program, the CPU 91 starts the process in accordance with the program installed into the storage device 97. A recording medium is not limited to the CD-ROM to store the program. The recording medium 99 may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

The student processing part 70, the received problem table 61 and the answer table 62, which are illustrated in FIG. 1, are realized by processes performed by the CPU 91 which executes the installed program pertinent to the student terminal 9.

Next, a data configuration example of the databases 31, 32, 34, and 35 stored in the storage part 30 of the teacher terminal 100 will be described with reference to FIG. 4 through FIG. 8.

FIG. 4 is a diagram illustrating a data configuration example of the student DB 31 of the teacher terminal 100. The student DB 31 illustrated in FIG. 4 is regarded as a database referred to by the drill operation processing part 40, and includes items of a "student ID", a "password", a "student name", and the like. The item of the "student ID" indicates identification information for identifying the student, the item of the "password" indicates the authentication information used to authenticate the student, and the item of the "student name" name indicates a name of the student.

In the data configuration example, the password of the student of the student ID "1001" indicates "sjhgpeut87", and the student name indicates "TARO AOKI". In this manner, student IDs, passwords, and student names are maintained for all students.

FIG. 5 is a diagram illustrating a data configuration example of the drill DB 32 of the teacher terminal 100. The drill DB 32 illustrated in FIG. 5 includes items of a "problem ID", a "problem text", an "option_1" to an "option_4", a "correct answer", and the like. The item of the "problem ID" indicates a problem number for specifying the problem, and the item of the "problem text" indicates content of the problem. The items of the "option_1" to the "option_4" indicate options to answer the problem text and include a correct answer for the problem text. The item for the "correct answer" indicates a number of the option (one of 1 to 4) indicating the correct answer.

In this data configuration example, the problem text of the problem ID "11" presents a question "WHEN WAS THE KAMAKURA SHOGUNATE FOUNDED ?", and the option_1, option_2, option_3, and option_4 indicate "1181", "1192", "1197", and "1199", respectively. For this problem, a number "2" indicating the option_2 is recorded in the item of the "correct answer".

The problem data 4_p_ including information pertinent to the problem stored in the drill DB 32 are sent from the teacher terminal 100 to the student terminal 9.

FIG. 6 is a data structure example of the drill start time table 33 of the teacher terminal 100. The drill start time table 33 illustrated in FIG. 6 includes items of a "date" and a "start time". The drill start time table 33 is used to maintain a drill start time which is recorded when the drill starts. In this example, the drill starts at the start time "10:00:05" on a date "2010/1/31".

FIG. 7 is a diagram illustrating a data structure example of the student answer DB 34 of the teacher terminal 100. The student answer DB 34 illustrated in FIG. 7 is used to maintain an answer, a correct/incorrect answer, and an answer time by corresponding to each of the problems for each of the students based on the answer data 7_p_ sent from each of the student terminals 9, and includes items of a "student ID", a "problem ID", an "answer", a "correct/incorrect answer", an "answer time (min)", and the like.

The item of the "student ID" indicates the student ID maintained in the student DB 31 depicted in FIG. 4. The item of the problem ID indicates the problem ID maintained in the drill DB 32 depicted in FIG. 5.

The item of the "answer" indicates a number of an option selected by the student. The item of the "correct/incorrect answer" indicates the correct/incorrect answer determination result, that is, indicates the conformity (the correct answer) or the nonconformity (the incorrect answer) of the number of the option selected by the student with the number of the option indicated by the item of the "correct answer" maintained in the drill DB 32 depicted in FIG. 5. In a case of the conformity (the correct answer), a mark "O" is indicated. In a case of the nonconformity (the incorrect answer), a mark "x" is indicated. Instead of the marks "O", "x", and the like, numerals "1", "0", and the like may used.

FIG. 8 is a diagram illustrating a data structure example of the warning-of answer time DB 35 of the teacher terminal 100. The warning-of answer time DB 35 depicted in FIG. 8 is used to maintain a reference value of the answer time in order to determine a state in which the drill is stopped for each of the problems, and includes the items of a "problem ID", a "warning-of answer time (min)", and the like.

The item of the "problem ID" indicates the problem ID maintained in the drill DB 32 depicted in FIG. 5. The item of the "warning-of answer time (min)" indicates a reference value of the answer time to determine whether there is need to stop the drill and explain about the problem by the teacher since more time to answer the problem is spent than expected.

In this example, in a case of the problem of the problem ID "11", if the students take "more than or equal to 3 (min)" to answer, it is determined to stop the drill. For other problem IDs, in the same manner, a value set in the item of the "warning-of answer time (min)" indicates the answer time to determine the drill stop. The "warning-of answer time (min)" may be maintained by seconds (s).

FIG. 9 is a diagram illustrating a data structure example of the warning-of correct answer percentage DB 36 of the teacher terminal 100. The warning-of correct answer percentage DB 36 depicted in FIG. 9 is used to maintain a reference value of the correct answer percentage to determine the state of stopping the drill, and includes items of a “problem ID”, a “warning-of correct answer percentage”, and the like.

The item of the “problem ID” indicates the problem ID maintained in the drill DB 32 depicted in FIG. 5. The item of the warning-of correct answer percentage indicates a reference value of the correct answer percentage to determine whether there is need to stop the drill and explain about the problem by the teacher since the correct answer percentage is lower than expected.

In this example, in a case of the problem of the problem ID “11”, if the correct answer percentage of the students is “less than or equal to 20%”, it is determined to stop the drill. For other problem IDs, in the same manner, a value set in the item of the “warning-of correct answer percentage” indicates the correct answer percentage to determine the drill stop.

FIG. 10 is a diagram illustrating a data structure example of the warning condition DB 37 of the teacher terminal 100. The warning condition DB 37 depicted in FIG. 10 is used to maintain a condition by a combination of the answer time and the correct answer percentage for each of the problems to determine the drill stop, and includes items of a problem ID, and a warning condition by values of the answer time (min) and the warning-of answer percentage.

The item of the “problem ID” indicates the problem ID maintained in the drill DB 32 depicted in FIG. 5. The item of the warning-of condition further includes items of a warning answer time (min) and a warning-of correct answer percentage. The warning-of condition indicates a condition by combining a value of the waning-of answer time (min) and a value of the warning-of correct answer percentage.

In this example, in a case of the problem of the problem ID “11”, if the condition for stopping the drill is “more than or equal to 2 min” indicated by the warning-of answer time and the correct answer percentage of the students is “less than or equal to 25%” indicated by the warning-of correct answer percentage, it is determined to stop the drill.

FIG. 11 is a diagram illustrating a data structure example of the answer percentage threshold table 38 of the teacher terminal 100. The answer percentage threshold table 38 depicted in FIG. 11 is used to maintain a threshold to determine whether a sufficient answer percentage is acquired to determine the drill stop.

When the answer percentage of the students is more than the answer percentage threshold “60%”, a determination of the drill stop starts. When the answer percentage of the students is less than or equal to the answer percentage threshold, the determination of the drill stop is suppressed.

FIG. 12 is a diagram illustrating a data structure example of the condition matching table 39 of the teacher terminal 100. The condition matching table 39 depicted in FIG. 12 is used to maintain a percentage of a number of students, whose answer time corresponds to the warning-of answer time depicted in FIG. 8, of a number of answered students, in order to determine the drill stop.

In this case, when the percentage of the number of students, whose answer time corresponds to the warning-of answer time depicted in FIG. 8, is more than the condition matching percentage “50%”, it is determined that the condition of the drill stop is satisfied and the progress is displayed. After the progress is displayed, the drill is stopped in response to an instruction of the teacher. When this percentage is less than or equal to the condition matching percentage “50%”, the drill stop based on the warning-of answer time is suppressed.

Next, each data structure example of the tables 61 and 62 stored in the storage part 60 of the student terminal 9 will be described with reference to FIG. 13 and FIG. 14.

FIG. 13 is a diagram illustrating a data configuration example of the received problem table 61 of the student terminal 9. The received problem table 61 depicted in FIG. 9 is used to store the problem data 4*p* sent from the teacher terminal 100 after the authentication of the student, and includes items of a “problem ID”, a “problem text”, an “option_1” to “an option_4”, and the like. The item of the “problem ID” indicates a problem number specifying the problem, and the problem text indicates content of the problem. The items of the “option_1” to the “option_4” indicate options to answer the problem text, and include a correct answer for the problem text.

FIG. 14 is a diagram illustrating a data configuration example of the answer table 62 of the student terminal 9. The answer table 62 depicted in FIG. 14 includes items of a “problem ID”, and an “answer”.

The item of the “problem ID” indicates the problem ID maintained in the drill DB 32 depicted in FIG. 5. The item of the “answer” indicates the number of the option selected by the student at the student terminal 9.

The problem ID, the answer, and the answer time (min), which is measured, are additionally included in the answer data 7*p* and the answer data 7*p* are sent from the student terminal 9 to the teacher terminal 100, each time the student answers the problem.

Next, each of processes conducted by the teacher terminal 100 and the student terminal 9 will be described.

Figure 15:
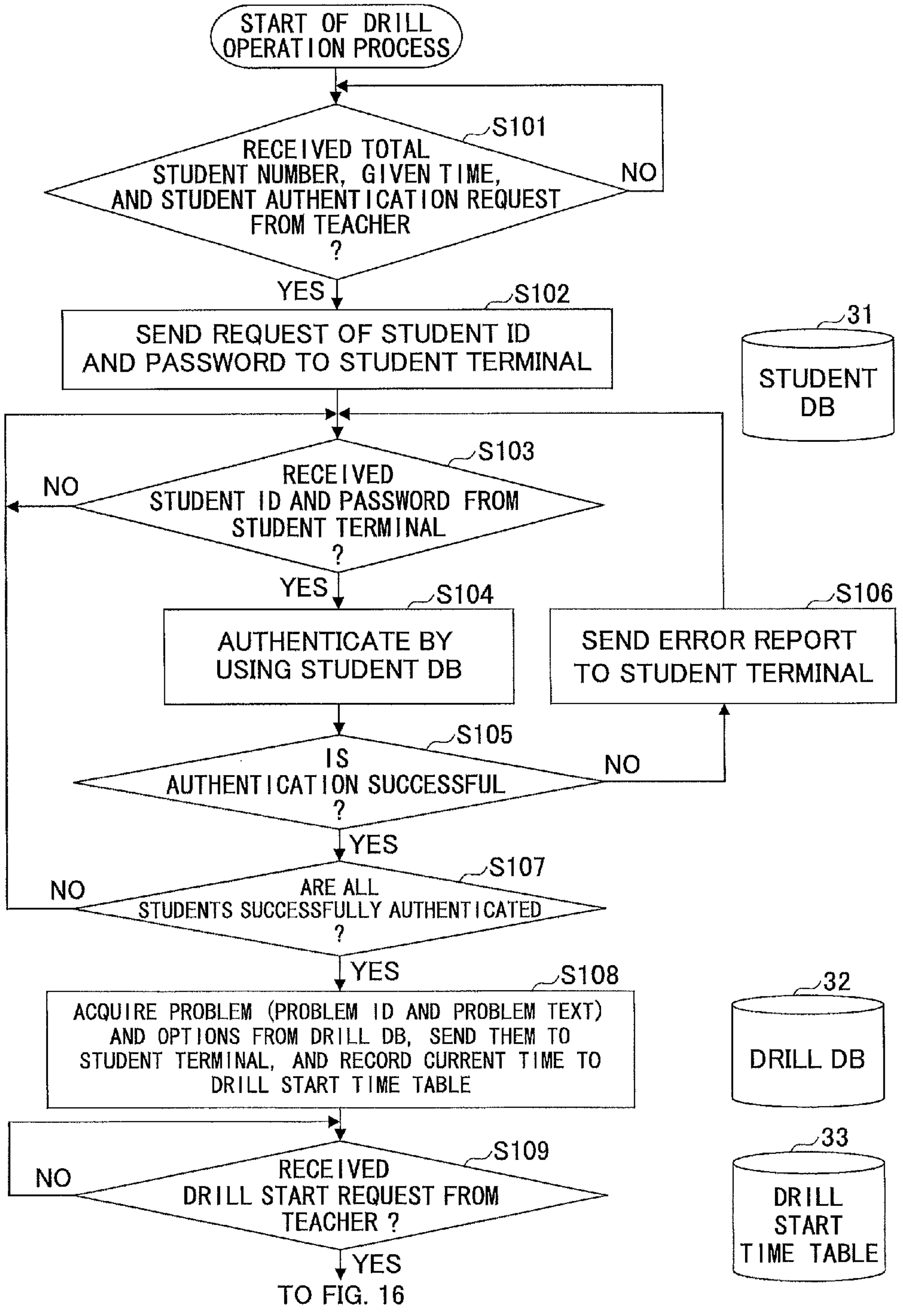
FIG. 15 is a flowchart for explaining a drill operation process by a drill operation processing part of the teacher terminal.
Figure 16:
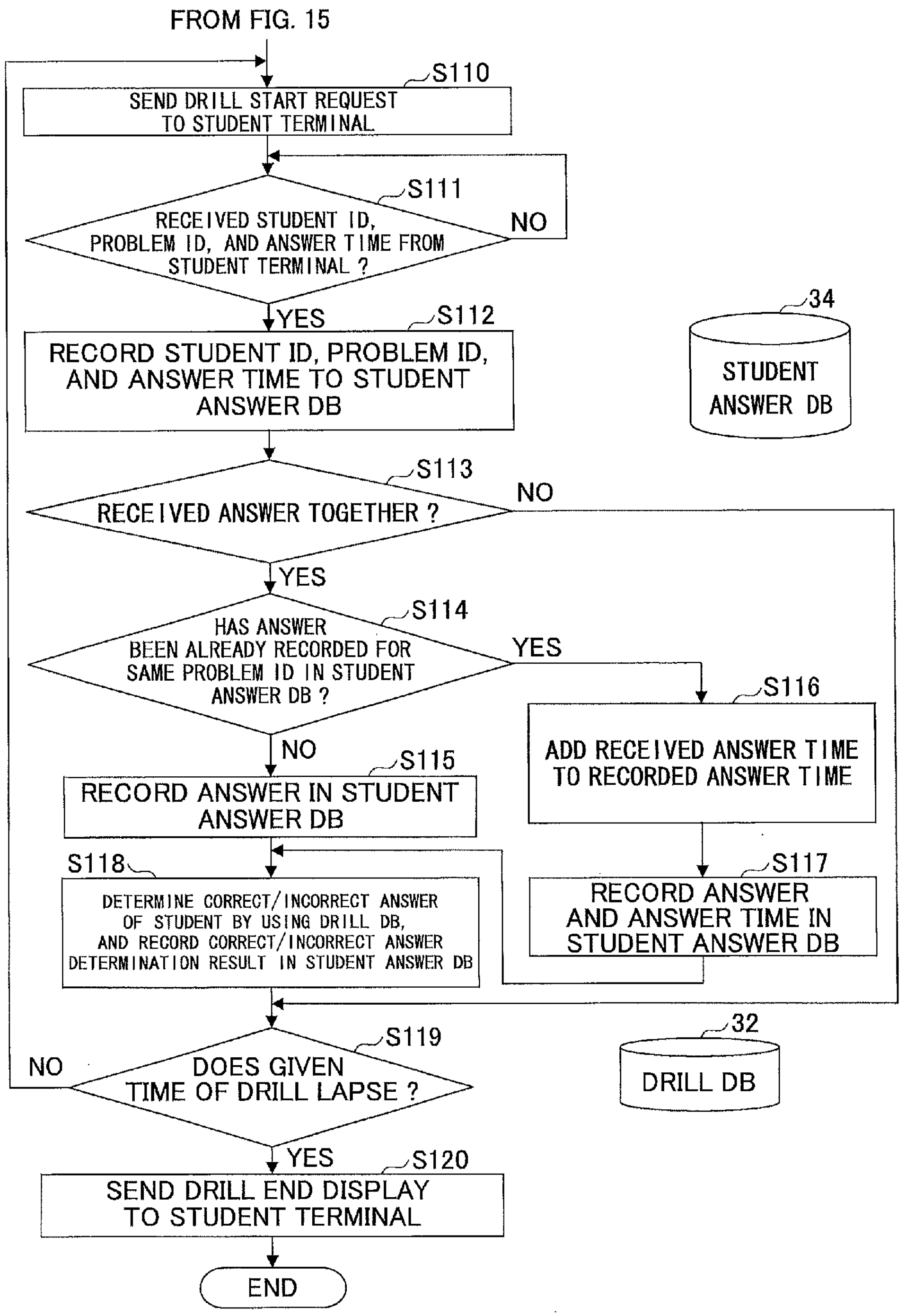
FIG. 16 is a flowchart for explaining the drill operation process by the drill operation processing part of the teacher terminal.
Figure 17:
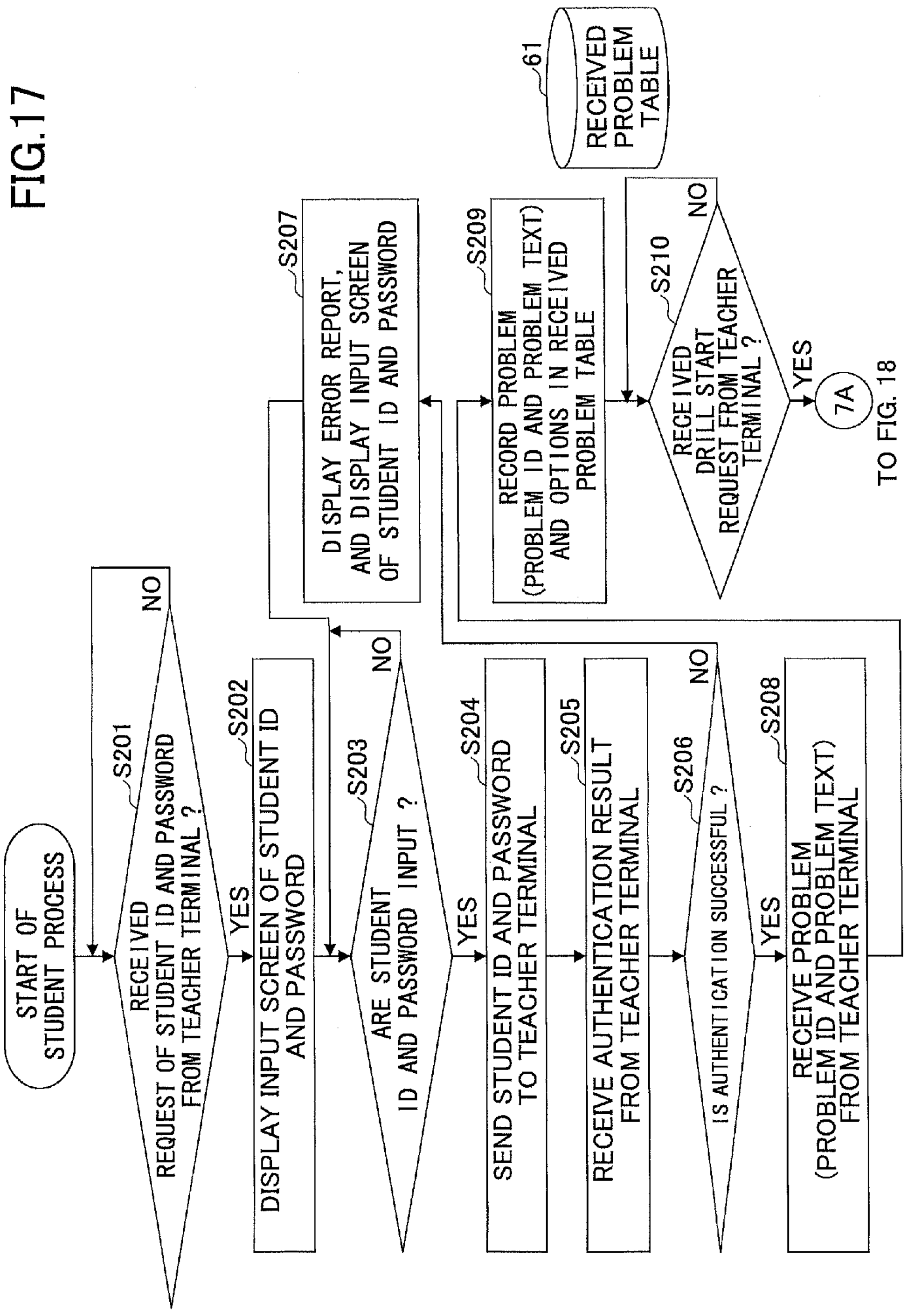
FIG. 17 is a flowchart for explaining a student process by a student processing part of the student terminal.

FIG. 15 and FIG. 16 are flowcharts for explaining a drill operation process by the drill operation processing part 40 of the teacher terminal 100. By steps S101 through S120 depicted in FIG. 15 and FIG. 16, a sequence of the drill operation process will be described.

The drill operation processing part 40 of the teacher terminal 100 determines whether the total student number, a given time, and a student authentication request are received from the teacher (step S101). When the total student number, the given time, and the student authentication request are not received from the teacher, step S101 is repeated until receiving from the teacher. On the other hand, when the total student number, the given time, and the student authentication request are received from the teacher, the drill operation processing part 40 stores the student total number and the given time in the working area in the storage part 30.

In response to the student authentication request, the drill operation processing part 40 sends a request of the student ID and the password to the student terminal 9 (step S102). The drill operation processing part 40 determines whether the student ID and the password are received from the student terminal 9 (step S103). When the teacher terminal 100 does not receive the student ID and the password, the drill operation processing part 40 repeats step S103 until receiving those. On the other hand, when the teacher terminal 100 receives the student ID and the password, the drill operation processing part 40 authenticates the student by using the student DB 31 (step S104).

The drill operation processing part 40 determines whether the authentication is successful (step S105). When the authentication fails, the drill operation processing part 40 sends an authentication error to the student terminal 9 (step S106), and goes back to step S103 to authenticate the student in the same manner.

On the other hand, the drill operation processing part 40 further determines whether all students are successfully authenticated (step S107). When all students are not successfully authenticated, the drill operation processing part 40 goes back to step S103 and repeats the above described process in the same manner.

When all students are successfully authenticated, the drill operation processing part 40 acquires the problem (the problem ID and the problem text) and the options_1 through the option_4 from the drill DB 32, and sends those as the problem data 4*p* to the student terminal 9 (step S108).

After that, the drill operation processing part 40 determines whether a test start request is received from the teacher (step S109). When the test start request is not received, the drill operation processing part 40 repeats step S109 until receiving the test start request. On the other hand, when the test start request is received, the drill operation processing part 40 sends the test start request to the student terminal 9 (step S110).

After the test is started, the drill operation processing part 40 determines whether the answer data 7*p*, which includes the student ID, the problem ID, the answer, and the answer time, are received (step S111). When the answer data 7*p* are not received, the drill operation processing part 40 repeats step S111 until receiving the answer data 7*p*. On the other hand, when the answer data 7*p* are received, the drill operation processing part 40 records the student ID, the problem ID, and the answer time, which are included in the answer data 7*p*, in the student answer DB 34 (step S112).

Next, the drill operation processing part 40 determines whether the teacher terminal 100 also receives the answer together at the same time (step S113). It is determined whether the answer is included in the answer data 7*p*. When the answer is not included in the answer data 7*p*, the drill operation processing part 40 advances to step S119. In a case in which the student addressed the problem (spent the time to answer the problem) but the student is not able to answer the problem, the answer may not be included in the answer data 7*p*.

On the other hand, in step S113, when the answer is included in the answer data 7*p*, the drill operation processing part 40 determines, by referring to the student answer DB 34, whether the answer has been already recorded in a record corresponding to the student ID and the problem ID included in the answer data 7*p* (step S114). When the answer has not been recorded, the drill operation processing part 40 records the answer included in the answer data 7*p* in the record which is processed in step S112 in the student answer DB 34 (step S115). Then, the drill operation processing part 40 advances to step S118.

On the other hand, in step S114, when the answer has been already recorded, the drill operation processing part 40 adds the answer time recorded and the answer time included in the answer data 7*p* received (step S116). The drill operation processing part 40 updates the student answer DB 34 by recording a value calculated in step S116 and the answer included in the answer data 7*p* (step S117). After that, the drill operation processing part 40 advances to step S118.

The drill operation processing part 40 acquires a value which is set in the item of the "answer" in the drill DB 32, determines whether the answer of the student is correct or incorrect, by comparing the acquired value and the answer included in the answer data 7*p*, and records a correct/incorrect answer determination result in the student answer DB 34 (step S118).

After that, the drill operation processing part 40 determines whether the given time of the test lapses (step S119). When the given time of the drill does not lapse, the drill operation processing part 40 goes back to step S110, and repeats the above described processes. On the other hand, when the given time of the drill lapses, the drill operation processing part 40 sends a drill end report to the student terminal 9 (step S120), and terminates this drill operation process.

Next, processes in the student terminal 9 will be described with reference to FIG. 17 through FIG. 20. FIG. 17 through FIG. 20 are flowcharts for explaining the student process by the student processing part 70 of the student terminal 9. The student process is explained by steps S201 to S240 illustrated in FIG. 17 through FIG. 20.

The student processing part 70 of the student terminal 9 determines whether the request of the student ID and the password is received from the teacher terminal 9 (step S201). When the request is not received, the student processing part 70 repeats step S201 until receiving the request. On the other hand, when the request is received, the student processing part 70 displays an input screen for inputting the student ID and the password at the display device 93 of the student terminal 9 (step S202).

After displaying the input screen, the student processing part 70 determines whether the student ID and the password are input by the student (step S203). When the student ID and the password are not input, the student processing part 70 repeats step S203 until the student inputs the student ID and the password. On the other hand, when the student ID and the password are input, the student processing part 70 sends the student ID and the password to the teacher terminal 100 (step S204), and receives an authentication result from the teacher terminal 100 (step S205).

The student processing part 70 determines whether the authentication result indicates that the student is successfully authenticated (step S206). When the authentication result indicates that the authentication of the student has failed, the student processing part 70 displays an error report at the display device 93, and displays the input screen of the student ID and the password again (step S207). The student processing part 70 goes back to step S203, and repeats the above described process in the same manner.

On the other hand, when the authentication result indicates that the authentication of the student is successful in step S206, the student processing part 70 receives the problem data 4*p* including the problem (the problem ID and the problem text) and the option_1 to the option_4 from the teacher terminal 100 (step S208), and records the problem data 4*p* in the received problem table 61 (step S209).

The student processing part 70 determines whether a start request is received from the teacher terminal 100 (step S210). When the start request is not received, the student processing part 70 repeats step S210 until receiving the start request. On the other hand, when the start request is received, the student processing part 70 advances to step S211 in FIG. 18.

Figure 18:
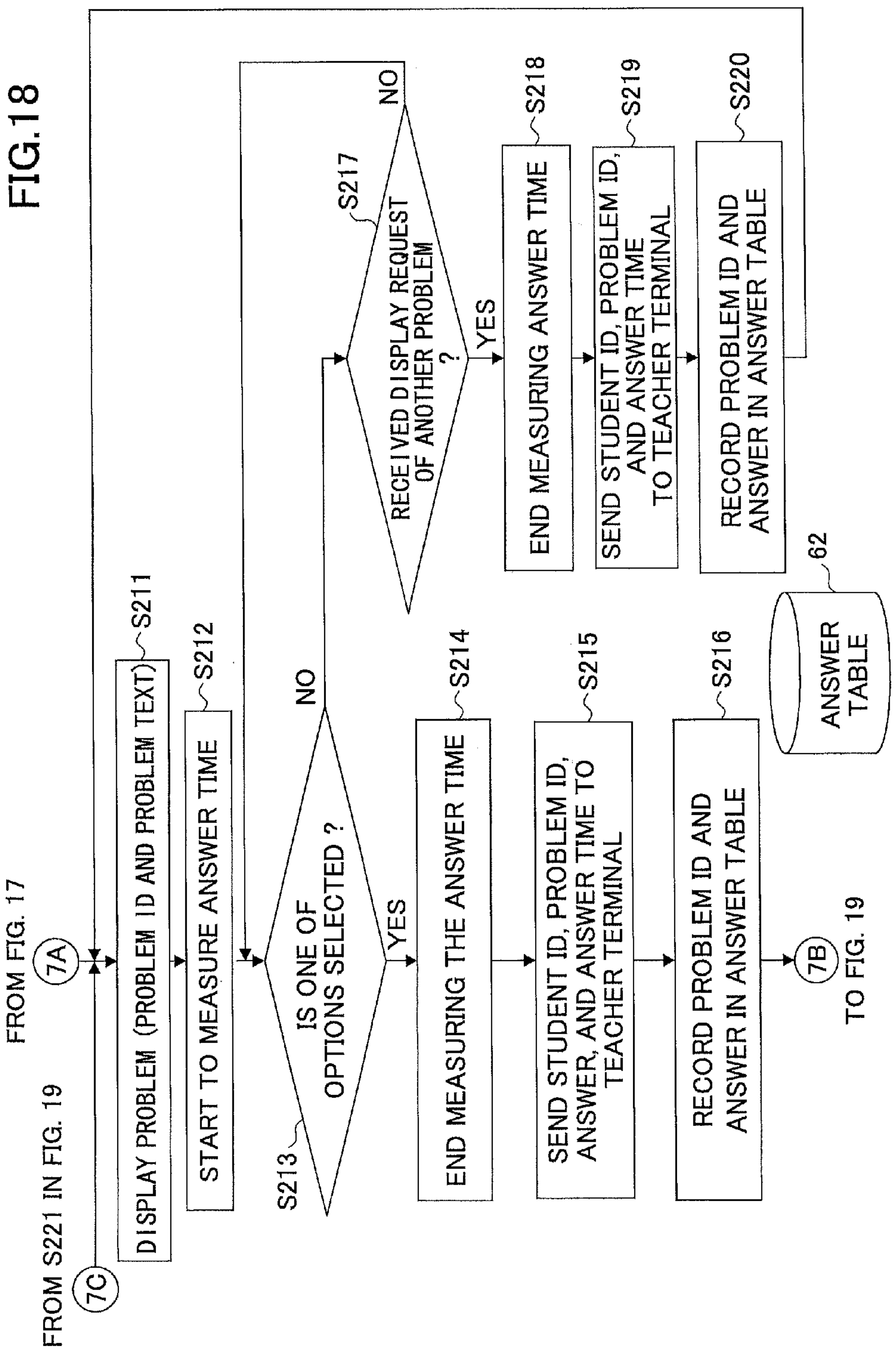
FIG. 18 is a flowchart for explaining the student process by the student processing part of the student terminal.

In FIG. 18, the student processing part 70 displays the problem (the problem ID and the problem text) and the option_1 through the option_4 at the display device 93 (step S211), and starts to measure the answer time (step S212).

The student processing part 70 determines whether one of the option_1 through the option_4 is selected by the student (step S213). When one of the option_1 through the option_4 is selected, the student processing part 70 ends measuring the answer time (step S214), and sends the answer data 7*p*, which includes the student ID, the problem ID, the answer (the number of the option selected by the student), and the answer time, to the teacher terminal 100 (step S215). Also, the student processing part 70 records the student ID, the problem ID, and the answer (the number of the option selected by the student) in the answer table 62 (step S216). Also, the student processing part 70 advances to step S222 in FIG. 19.

On the other hand, it is determined in step S213 that the student has not selected one of the option_1 through the option_4, the student processing part 70 determines whether a display request of another problem is received (step S217). If the display request is not received, the student processing part 70 conducts step S213 again.

On the other hand, if it is determined that the display request is received in step S217, the student processing part 70 ends measuring the answer time (step S218), and sends the answer data 7_p_, which includes the student ID, the problem ID, and the answer time, to the teacher terminal 100 (step S219). The student processing part 70 records the problem ID and the answer in the answer table 62 (step S220), and goes back to step S211 to conduct the above described processes in the same manner.

Figure 19:
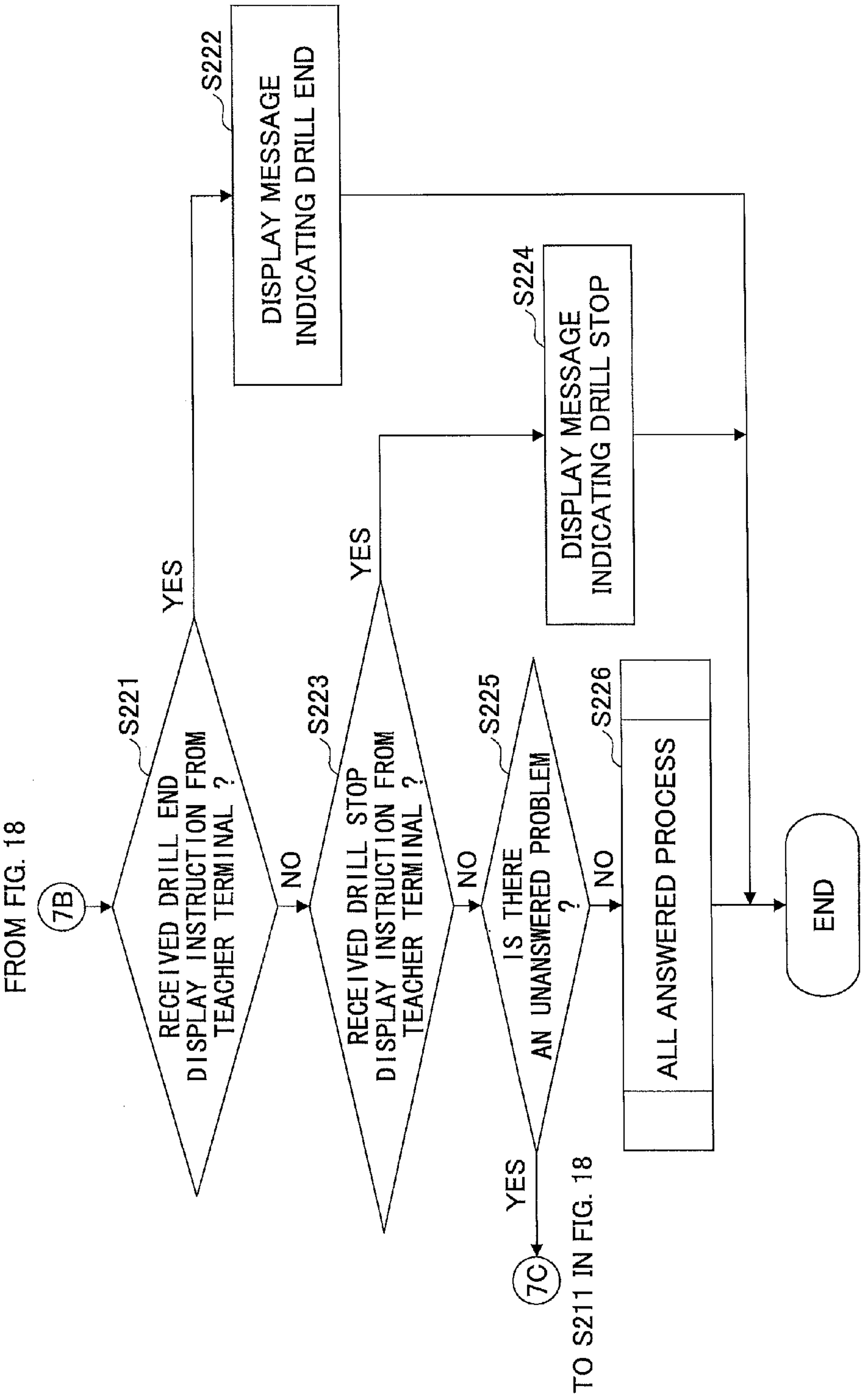
FIG. 19 is a flowchart for explaining the student process by the student processing part of the student terminal.

In FIG. 19, the student processing part 70 determines whether the student terminal 9 receives a drill end display instruction from the teacher terminal 100 (step S221). When the student terminal 9 receives the drill end display instruction, the student processing part 70 displays a message indicating the drill end at the display device 93 (step S222), and terminates this student process.

On the other hand, when it is determined in step S221 that the student terminal 9 does receive the drill end display instruction, the student processing part 70 further determines whether the drill stop display instruction 9_p_ is received from the teacher terminal 100 (step S223). If the drill stop display instruction 9_p_ is received, the student processing part 70 displays a message indicating the drill stop at the display device 93 (step S224), and terminates this student process.

On the other hand, if it is determined in step S223 that the drill stop display instruction 9_p_ is not received, the student processing part 70 determines whether there is an unanswered problem (step S225). The student processing part 70 determines whether there is a problem ID which is not recorded in the answer table 62 in the problem IDs maintained in the received problem table 61. When there is the unanswered problem, the student processing part 70 advances to step S211 in FIG. 18 and repeats the above described processes in the same manner.

When it is determined in step S225 that there is no unanswered problem, after conducting an all answered process (step S226), the student processing part 70 terminates this student process.

Figure 20:
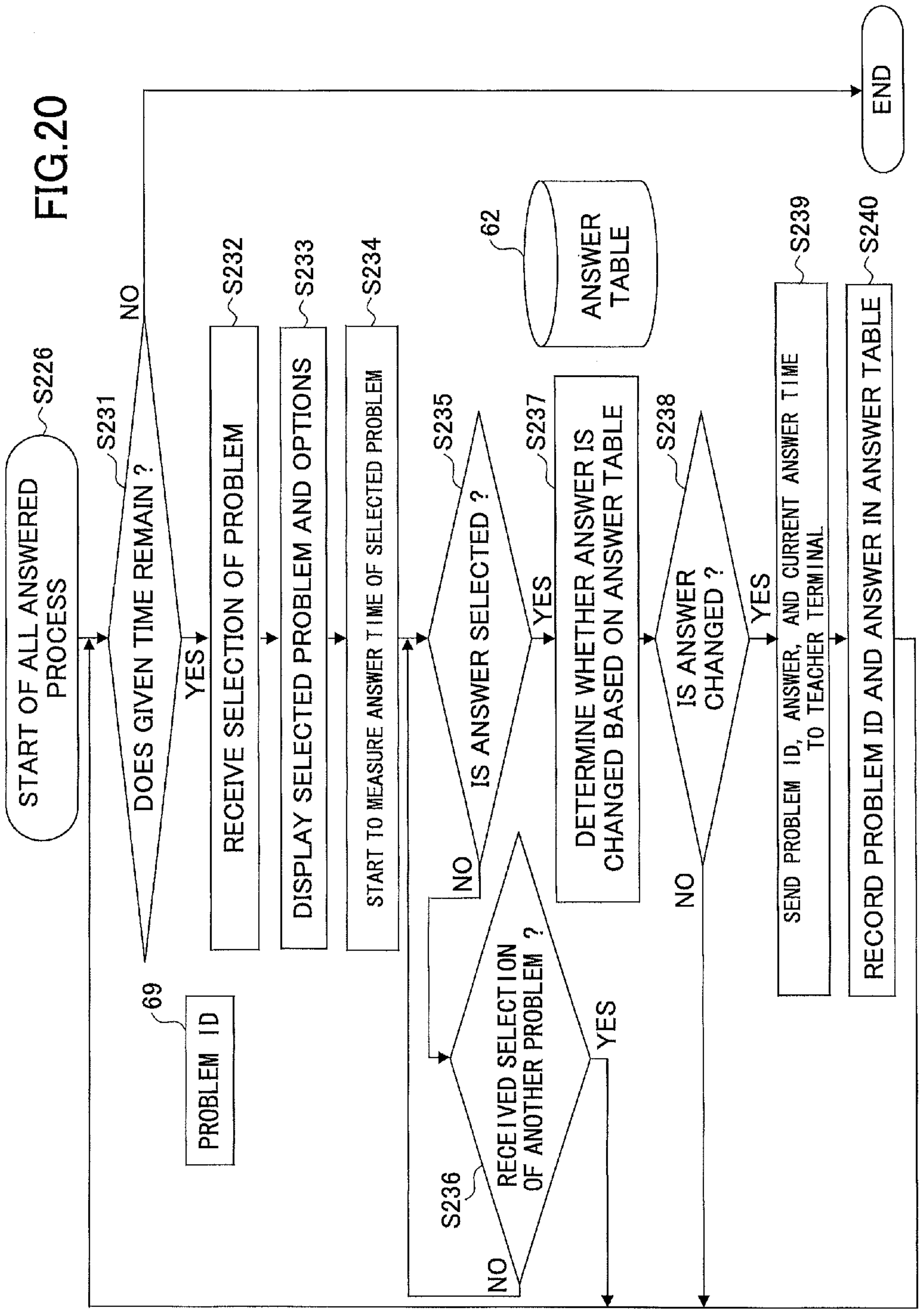
FIG. 20 is a flowchart for explaining the student process by the student processing part of the student terminal.

FIG. 20 is a flowchart for explaining the all answered process in step S226 in FIG. 19. The student processing part 70 determines whether any of the given time is remaining (step S231). When none of the given time is remaining, the student processing part 70 terminates this all answered process.

On the other hand, when it is determined in step S231 that some of the given time is remaining, the student processing part 70 receives a selection of the problem from the student (step S232). The student processing part 70 stores the problem ID 69 of the problem selected by the student in the working area in the storage part 60. After receiving the problem ID of the problem selected by the student, the student process part 70 displays the problem (the problem ID and the problem text) and the option_1 through the option_4 (step S233), and starts to measure the answer time of the selected problem (step S234).

The student processing part 70 determines whether the answer (one of the option_1 through the option_4) is selected (step S235). When it is determined in step S235 that the answer (one of the option_1 through the option_4) is not selected, the student processing part 70 further determines whether the student terminal 9 receives a selection of another problem (step S236). When the student terminal 9 receives the selection of another problem, the student processing part 70 goes back to step S231 and repeats the above described processes in the same manner. On the other hand, when it is determined in step S231 that the student terminal 9 does not receive the selection of another problem, after storing the problem ID 69 of the problem selected by the student, the student processing part 70 goes back to step S235, and repeats the above described processes in the same manner.

When it is determined that the answer (one of the option_1 through the option_4) is selected, the student processing part 70 determines based on the answer table 62 whether the answer is changed (step S237). The student processing part 70 refers to the answer table 62 by using the problem ID 69, and determines whether the answer is changed. If the number of the option recorded in the item of the "answer" for the problem ID 69 in the answer table 62 does not match with the number of the option determined in step S236, it is determined that the answer is changed.

The student processing part 70 determines whether the answer is changed (step S238). When it is determined that the answer is not changed, the student processing part 70 goes back to step S231 and repeats the above described processes in the same manner. On the other hand, when it is determined that the answer is changed, the student processing part 70 sends the problem data 4_p_, in which the problem ID, the answer, and a current answer time are included and the student ID is additionally included, to the teacher terminal 100 (step S239).

Also, the student processing part 70 records the problem ID and the answer (one of the option_1 through the option_4) in the answer table 26 (step S240), goes back to step S231, and repeats the above described processes in the same manner.

Figure 21:
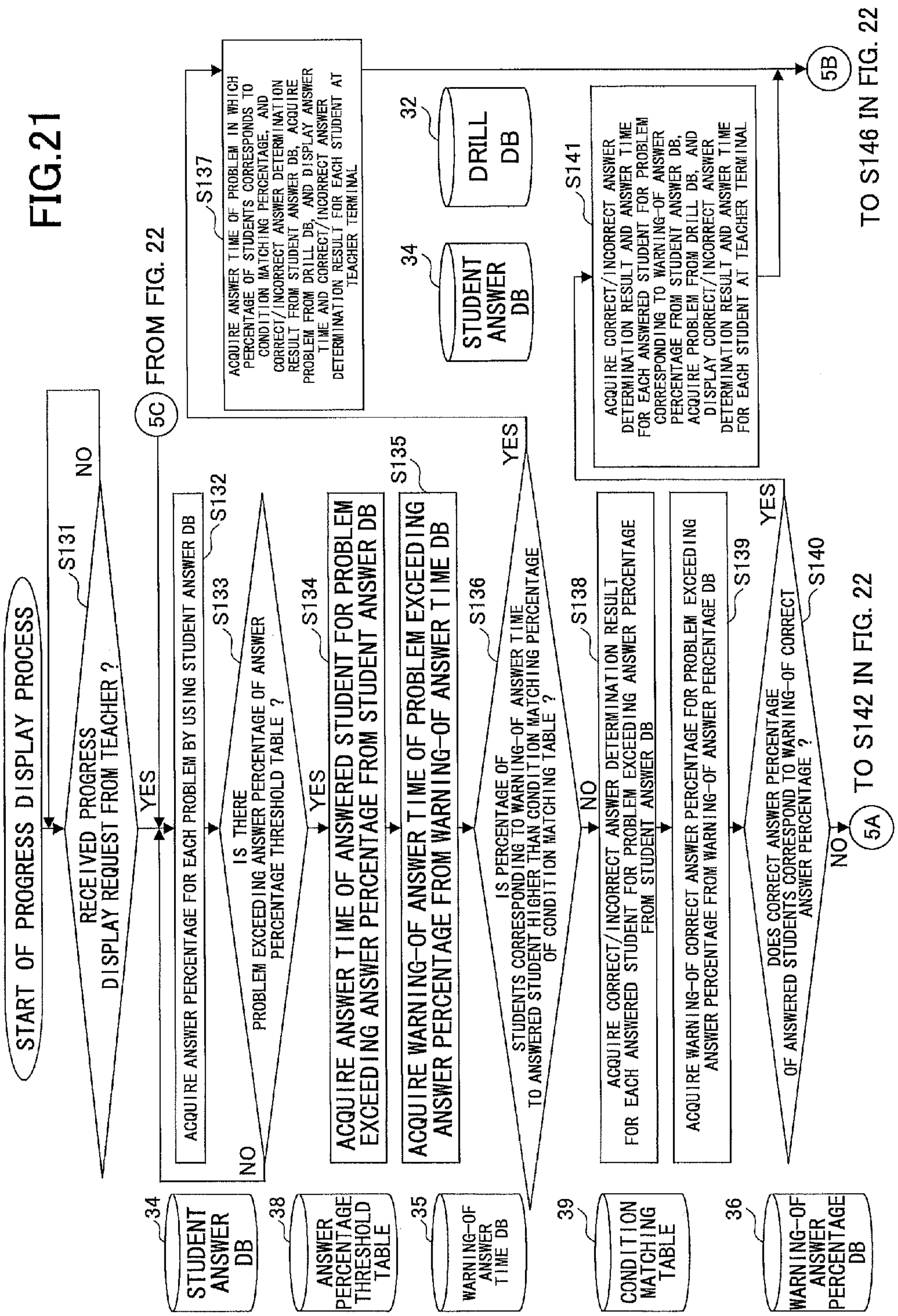
FIG. 21 is a flowchart for explaining a progress display process conducted by a progress display processing part of the teacher terminal.
Figure 22:
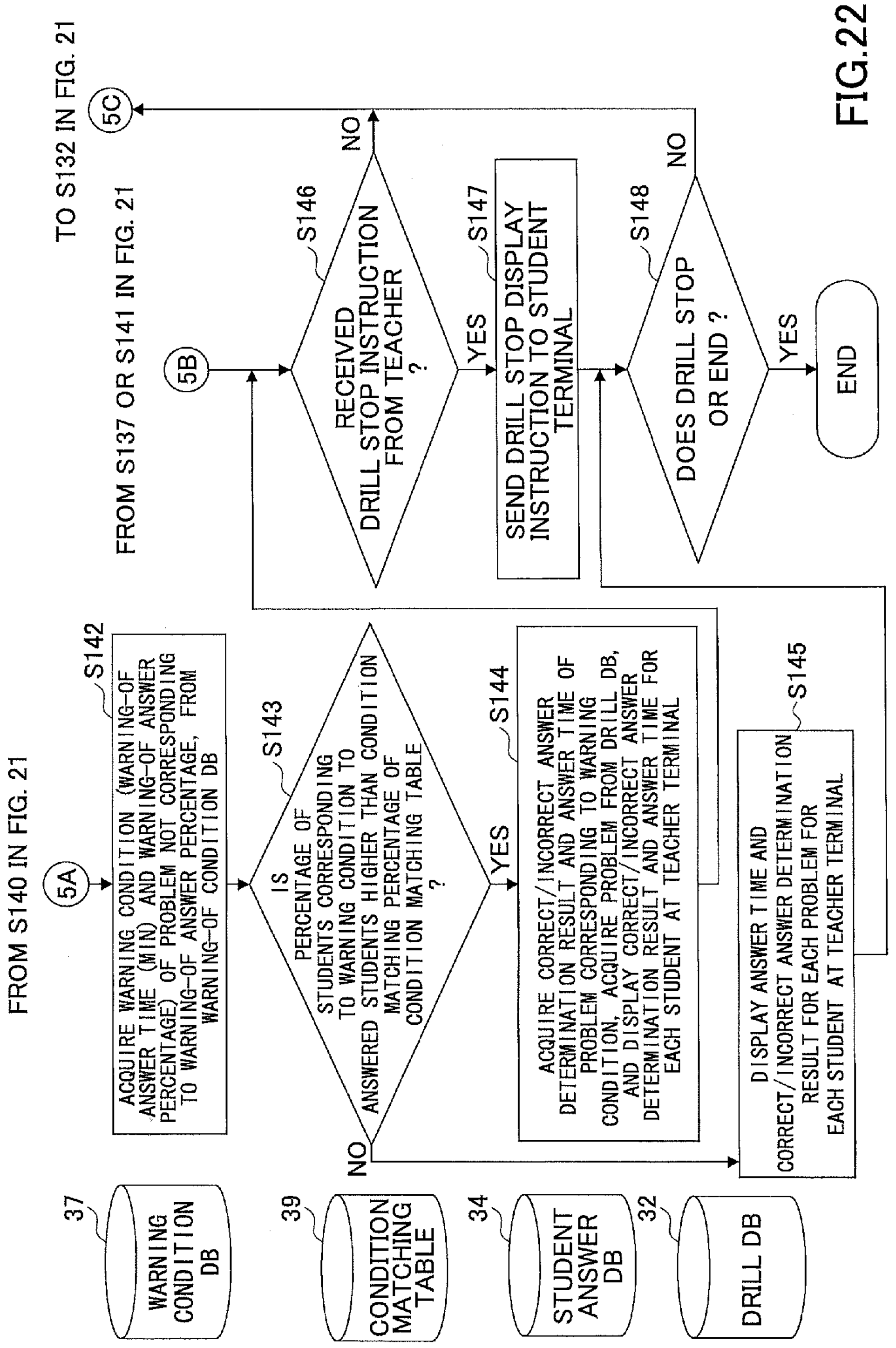
FIG. 22 is a flowchart for explaining the progress display process conducted by the progress display processing part of the teacher terminal.

Next, the progress display process, which is conducted by the progress display processing part 50 after the drill is started, will be described with referring to FIG. 21 and FIG. 22. FIG. 21 and FIG. 22 are flowcharts for explaining the progress display process conducted by the progress display processing part 50 of the teacher terminal 100. By steps S131 through S148 in FIG. 21 and FIG. 22, a sequence of the progress display process will be described.

The progress display processing part 50 of the teacher terminal 100 determines whether teacher terminal 100 receives the progress display request from the teacher (step S131). When the teacher terminal 100 does not receive the progress display request from the teacher, the progress display processing part 50 repeats step S131 until receiving the progress display request.

On the other hand, when the teacher terminal 100 receives the progress display request from the teacher, the progress display processing part 50 acquires the answer percentage for each of the problems by using the student answer DB 34 (step S132), and determines whether there is a problem which exceeds the answer percentage maintained in the answer percentage threshold table 38 (step S133). The progress display processing part 50 acquires the answer time for each of the answered students who answered the problem exceeding the answer percentage, from the student answer DB 34 (step S134). Also, the progress display processing part 50 acquires the answer time of the answered students of the problem exceeding the answer percentage from the student answer DB 34 (step S135).

After that, the progress display processing part 50 determines whether a percentage of students, who correspond to the warning-of answer time acquired from the student answer DB 34, with respect to the answered students is higher than the condition matching percentage of the condition matching table 39 (step S136).

When it is determined in step S136 that the percentage of the students is higher than the condition matching percentage, the progress display processing part 50 acquires the answer time, the answer, and the correct/incorrect answer determination result of the problem in which the percentage of the students satisfies the condition matching percentage, from the student answer DB 34, acquires the problem (the problem ID and the problem text) from the drill DB 32, and displays a progress display screen (FIG. 23) including a list in which the answer time and the correct/incorrect answer determination result correspond to each of the students, at the display device 13 of the teacher terminal 100 (step S137). After that, the progress display processing part 50 advances to step S146 in FIG. 22.

In step S137, the progress display processing part 50 acquires records indicating the problem ID of the problem exceeding the answer percentage from the student answer DB 34, and acquires the answer time, the answer, and the correct/incorrect answer determination result for each of the student IDs from the acquired records. Next, the progress display processing part 50 acquires the problem (the problem ID and the problem text) by acquiring the records indicating the problem ID of the problem exceeding the answer percentage. Then, the progress display processing part 50 displays a list in which the answer time and the correct/incorrect answer determination result correspond to each of the student IDs with respect to the problem at the display device 13, and advances to step S146 in FIG. 22. In this case, the progress display processing part 50 may acquire the warning-of answer time (min) corresponding to the problem ID from the warning-of answer time DB 35, and may display the warning-of answer time (min) with the problem (the problem ID and the problem text) at the display device 13.

On the other hand, when it is determined in step S136 that the percentage of the students is less than or equal to the condition matching percentage, the progress display processing part 50 acquires the correct/incorrect answer determination result of the answered students with respect to the problem exceeding the answer percentage (step S138). Also, the progress display processing part 50 acquires the warning-of answer percentage corresponding to the problem exceeding the answer percentage from the warning-of answer percentage DB 36 (step S139).

Also, the progress display processing part 50 determines whether the answer percentage of the answered student with respect to the problem exceeding the answer percentage corresponds to the warning-of answer percentage (step S140). The progress display processing part 50 counts a number of records (a number of students who correctly answered) in which the correct/incorrect answer determination result corresponding to the problem ID of the problem exceeding the answer percentage in the student answer DB 34. The progress display processing part 50 calculates the percentage of the number of students who correctly answered with respect to the number of the answered students. Then, the progress display processing part 50 determines whether the calculated correct answer percentage corresponds to the warning-of correct answer percentage acquired in step S139.

When the correct answer percentage of the answered student corresponds to the warning-of correct answer percentage, the progress display processing part 50 acquires the correct/incorrect answer determination result and the answer time of the answered students with respect to the problem corresponding to the warning-of correct answer percentage from the student answer DB 34, acquires the problem from the drill DB 32, and displays the progress display screen (FIG. 24) at the display device 13 of the teacher terminal 100 (step S141). The progress display screen (FIG. 24) displays a list in which the correct/incorrect answer determination result and the answer time correspond to each of the students. When the list is displayed, the correct answer percentage calculated in step S140 is also displayed. After that, the progress display processing part 50 advances to step S146 in FIG. 22.

In FIG. 22, the progress display processing part 50 acquires the warning condition (the warning-of answer time (min)) and the warning-of correct answer percentage) from the warning condition DB 37 for the problem determined which does not correspond to the warning-of correct answer percentage in step S140 (step S142). The progress display processing part 50 determines whether the percentage of the students matching the warning condition with respect to the answered students is more than the condition matching percentage of the condition matching table 39 (step S143).

The progress display processing part 50 acquires the warning condition (the warning-of answer time (min) and the warning-of correct answer percentage) corresponding to the problem ID from the warning condition DB 37 by using the problem ID of the problem, which is determined in step S140 that the problem does not correspond to the warning-of answer percentage (which is excluded in step S140).

The progress display processing part 50 refers to the student answer DB 34 by using the problem ID of the problem which is excluded in step S140, and counts the record number (the number of the answered students). Also, the progress display processing part 50 counts the number of records in which the answer time corresponding to the problem ID of the problem excluded in step S140 corresponds to the warning-of answer time (min) acquired from the warning condition DB 37, and calculates the percentage of the number of the students, who spent more time than expected, with respect to the number of the answered students. The number of records corresponds to the number of students who spent more time than expected.

When the percentage of the number of the students, who spent more time than expected, with respect to the number of the answered students is more than the condition matching percentage of the condition matching table 39, the progress display processing part 50 counts the number of records, in which the correct/incorrect answer determination result indicates a correct answer for the problem ID of the problem excluded in step S140, in the student answer DB 34. The progress display processing part 50 calculates the percentage (the correct answer percentage) of the number of the students who correctly answered, with respect to the number of the answered students.

The progress display processing part 50 further determines whether the correct answer percentage is more than the condition matching percentage of the condition matching table 39. When the correct answer percentage is more than the condition matching percentage of the condition matching table 39, the progress display processing part 50 determines whether the percent of the students corresponding to the warning condition with respect to the answered students is more that the condition matching percentage.

When it is determined in step S143 that the percentage of the students is more than the condition matching percentage of the condition matching table 39, the progress display processing part 50 acquires the correct/incorrect answer determination result and the answer time of the problem corresponding to the warning condition from the student answer DB 34, acquires the problem from the drill DB 32, and displays the progress display screen (FIG. 25), which includes the list in which the correct/incorrect answer determination result and the answer time correspond to each of the students, at the display device 13 of the teacher terminal 100 (step S144). When the list is displayed, the correct answer percentage calculated in step S143 is displayed. After that, the progress display processing part 50 advances to step S146.

Following step S137 (FIG. 21), step S141 (FIG. 21), or step S144 (FIG. 22), the progress display processing part 50 determines whether the teacher terminal 100 receives the drill stop instruction from the teacher (step S146). When the progress display processing part 50 does not receive the drill stop instruction, the progress display processing part 50 goes back to step S132 (FIG. 21), and repeats the above described processes in the same manner.

On the other hand, when the teacher terminal receives the drill stop instruction in step S146, the progress display processing part 50 sends the drill stop display instruction 9*p* to the student terminal 9 (step S147).

After that, the progress display processing part 50 determines whether the drill is stopped or ends (step S148). When the drill is not stopped or does not end, the progress display processing part 50 goes back to step S132 (FIG. 21), and repeats the above described processes in the same manner. On the other hand, when the drill is stopped or ends, the progress display processing part 50 terminates this progress display process.

On the other hand, when it is determined in step S143 that the percentage of the students is less than or equal to the condition matching percentage of the condition matching table 39, the progress display processing part 50 displays an entire progress display screen (FIG. 26) by using the student answer DB 34 at the teacher terminal 100 (step S145). The entire progress display screen (FIG. 26) displays the answer time and the correct/incorrect answer determination result for each problem for each of the students. After that, the progress display processing part 50 advances to step S148. The progress display processing part 50 determines whether the drill is stopped or ends (step S148). When the drill is not stopped and does not end, the progress display processing part 50 goes back to step S132 (FIG. 21), and repeats the above described processes in the same manner. On the other hand, when the drill is not stopped or ends, the progress display processing part 50 terminates this progress display process.

Next, examples of screens displayed at the teacher terminal 100 will be described. FIG. 23 is a diagram illustrating the progress display screen displayed in step S137 in FIG. 21. A progress display screen G70 illustrated in FIG. 23 as the example includes a message display area 71, a problem display area 72, a warning-of answer time display area 73, a list display area 74, a "STOP" button 75 for instructing the drill stop, and a "DO NOT STOP" button 76 for suppressing the drill stop.

The message display area 71 displays a message for reporting to the teacher that the answer time of the students is more than expected. The problem display area 72 displays the problem text corresponding to the problem ID. The warning-of answer time display area 73 displays the warning-of answer time corresponding to the problem ID acquired from the warning-of answer time DB 35.

The list display area 74 displays the answer time and the correct/incorrect answer determination result acquired from the student answer DB 34 by corresponding to the student IDs of the students who answered the problem specified by the problem ID. When a value of the item of the "answer time (min)" exists and a value of the correct/incorrect answer determination result is blank in the student answer DB 34, a value "UNANSWERED" is displayed by corresponding to the student ID.

The "STOP" button 75 is used by the teacher to instruct the drill stop. When the teacher presses the "STOP" button 75, the drill stop display instruction 9*p* is sent to the student terminals 9 by the progress display processing part 50 (step S147). The "DO NOT STOP" button 76 is used by the teacher not to perform the drill stop. When the teacher presses the "DO NOT STOP" button 76, the progress display processing part 50 conducts the above processes from step S132 (FIG. 21).

Figure 24:
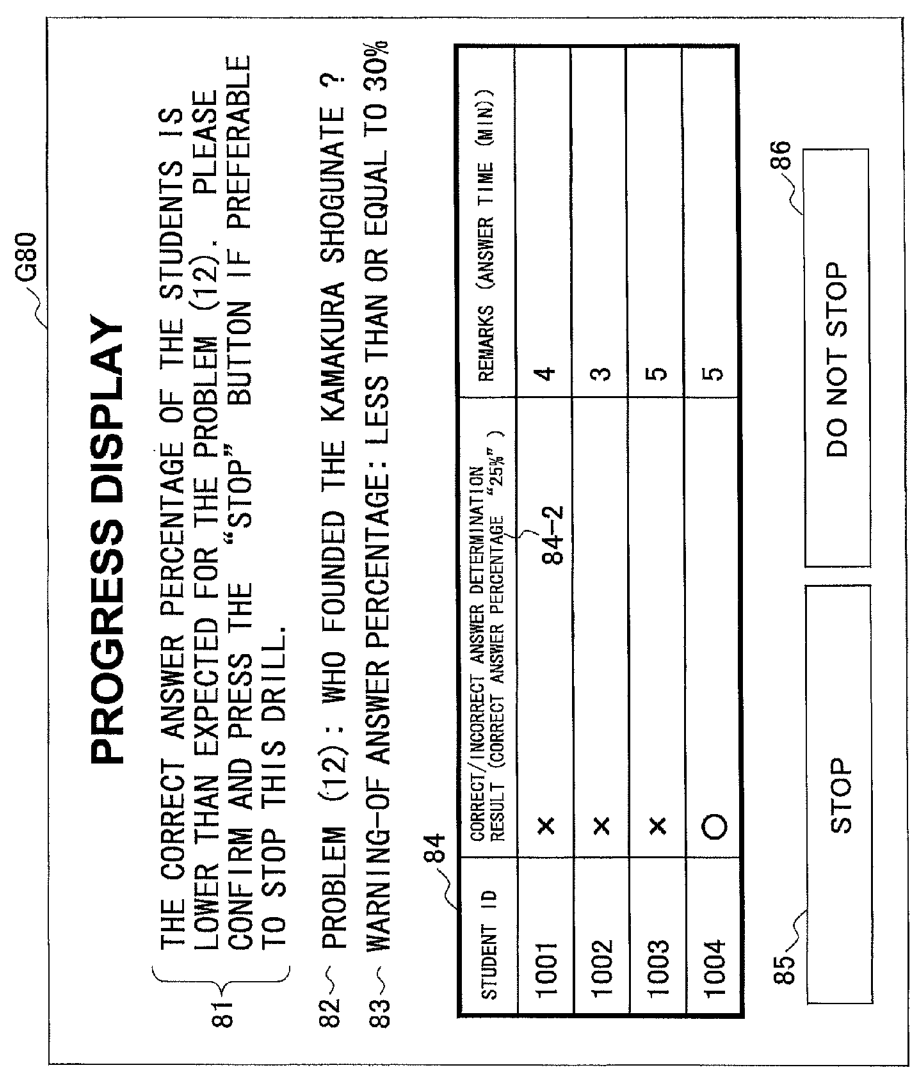
FIG. 24 is a diagram illustrating an example of the progress display screen displayed in step S141 in FIG. 21.

FIG. 24 is a diagram illustrating an example of the progress display screen displayed in step S141 in FIG. 21. A progress display screen G80 depicted in FIG. 14 as the example includes a message display area 81, a problem display area 82, a warning-of correct answer percentage display area 83, a list display area 84, a "STOP" button 85 for instructing the drill stop, and a "DO NOT STOP" button 86 for suppressing the drill stop.

The message display area 81 displays a message for reporting to the teacher that the correct answer percentage is less than expected. The problem display area 82 displays the problem text by corresponding to the problem ID. The warning-of correct answer percentage display area 83 displays the warning-of correct answer percentage corresponding to the problem ID from the warning-of correct answer percentage DB 36.

The list display area 84 displays the correct/incorrect answer determination result and the answer time acquired from the student answer DB 34 by corresponding to the student IDs of the students who answered the problem specified by the problem ID. Also, a correct answer percentage 84-2 of this problem is displayed.

The "STOP" button 85 and the "DO NOT STOP" button 86 are the same as the "STOP" button 75 and the "DO NOT STOP" button 76 in the progress display screen G70 depicted in FIG. 23.

FIG. 25 is a diagram illustrating an example of the progress display screen displayed in step S144 in FIG. 22. A progress display screen G90 illustrated in FIG. 25 as the example includes a message display area 91, a problem display area 92, a warning condition display area 93, a list display area 94, a "STOP" button 95 for instruction the drill stop, and a "DO NOT STOP" button 96 for suppressing the drill stop.

The message display area 91 displays a message for reporting to the teacher that the answer time and the correct answer percentage are worse than expected. The problem display area 92 displays the problem text corresponding to the problem ID. The warning condition display area 93 displays the warning condition (the warning-of answer time and the warning-of correct answer percentage) corresponding to the problem ID acquired from the warning-of answer time DB 35.

The list display area 94 displays the correct/incorrect answer determination result and the answer time acquired from the student answer DB 34 by corresponding to the student IDs of the students who answered the problem specified by the problem ID. Also, a correct answer percentage 94-2 is displayed.

The “STOP” button 95 and the “DO NOT STOP” button 96 are the same as the “STOP” button 75 and the “DO NOT STOP” button 76 in the progress display screen G70 depicted in FIG. 23.

Figure 26:
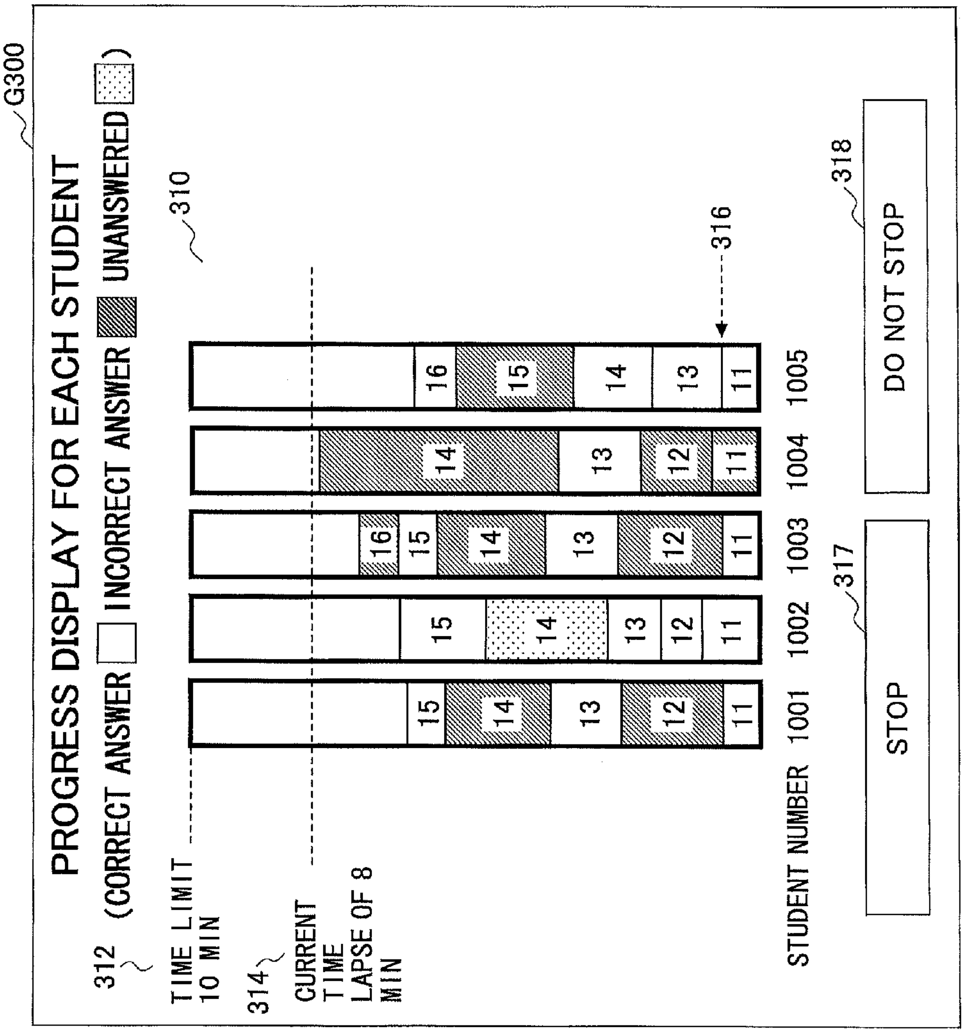
FIG. 26 is a diagram illustrating an example of the entire process display screen displayed in step S145 in FIG. 22.

FIG. 26 is a diagram illustrating an example of the entire process display screen displayed in step S145 in FIG. 22. An entire process display screen G300 illustrated in FIG. 26 as the example includes a graph 310, a “STOP” button 317 for instructing the drill stop, and a “DO NOT STOP” button 318 for suppressing the drill stop.

The graph 310 depicts a progress state of the drill by a bar chart for each of the students. In the bar chart, for each of the students, the entire length of a bar indicates a time limit 312 (which may be 10 minutes) of the drill. Each of bars depicts the answer times for respective problems included in the drill by vertically accumulating lengths of the answer times. In each of bars, each of the problems is indicated by a problem number (which may correspond to the problem ID). In addition, by representing different colors or depicting different background colors respective to multiple problem numbers, it may be possible to visually intuitively understand which problem is correctly answered, which problem is incorrectly answered, and which problem is unanswered.

In this example, for the time limit 312 of 10 minutes, a time lapse 314 from the drill start to a current time indicates that 8 minutes have elapsed. A state at this point indicates that a student of a student number “1001” spent time for problems of problem numbers “12” and “14” but incorrectly answered them. Also, the state indicates that a student of a student number “1002” spent time for the problem of the problem number “14” but was not able to answer it. Moreover, the state indicates that a student of a student number “1005” skipped the problem of the problem number “12” to work later since the problem number “12” is not displayed at a location of a numeral 316 where it is intended to display the problem number “12”.

The “STOP” button 317 and the “DO NOT STOP” button 318 are the same as the “STOP” button 75 and the “DO NOT STOP” button 76 in the progress display screen G70 in FIG. 23.

As described above, in the system 1000 according to the embodiment, it is possible to determine whether there is a problem which is considered to be that the students do not sufficiently understand the lesson, based on the progress state of multiple students while the drill is being conducted. Also, by the system 1000, it is possible to specify the problem which the students tend to incorrectly answer, and the problem which the students tend to spend time to answer, and to report to the teacher the specified problems. Thus, the teacher is able to promptly explain to the students about the problems by utilizing a drill operation time (corresponding to the given time for the drill). It is possible for the teacher to appropriately complement the insufficient explanation of the previous lesson. Accordingly, it is possible to improve comprehension of the students.

Since the drill is stopped and the students are given an explanation by the teacher utilizing the time given for the drill, the students are able to further comprehend the problems and are led to the correct answer within a class hour.

In the embodiment, in a case in which a problem, which is needed to be supplementarily explained, among problems included in the test, is detected during the test, it is possible to stop the test even in a test time. Accordingly, it is possible to perform the supplementary explanation without compressing an explanation time as much as possible.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A question setting apparatus, comprising:

a memory to store problem information that maintains problem data including a problem and a correct answer of the problem, the problem included in a specific test sent to multiple student terminals; and student answer information that maintains answer data and a correct/incorrect answer determination result for each of the multiple students, the answer data indicating an answer of a student for the problem; and a processor coupled to the memory and the processor performs a process including processing test operations of referring to the problem information;

sending the problem data to the multiple student terminals connected through a network;

receiving the answer data from multiple student terminals in a given time for the test; and recording the answer data in the student answer information; and processing a progress display by displaying a progress state at a display device in the given time by using the student answer information, the progress state indicating an answer state of the problem data based on the correct/incorrect answer determination result for the answer data, which are received from the multiple student terminals; and sending a display instruction, which is input at an input device which a teacher uses based on the progress state being displayed and causes the specific test to stop, to the multiple student terminals, wherein the answer data include an answer time of a student, and the displaying of the progress state includes conducting a first determination, which determines whether a percentage of students, in which the answer time reaches a warning-of answer time for warning of an end of the test, is more than a predetermined value;

conducting a second determination, which determines whether a correct answer percentage corresponds to a warning-of correct answer percentage for warning of the end of the tests, when the first determination determines that the percentage of the students is not more than the predetermined value;

conducting a third determination, which determines whether a percentage of students, who spent the answer time corresponding to the warning-of answer time, and the correct answer percentage corresponding to the warning-of correct answer percentage satisfy predetermined condition values, with respect to a problem corresponding to a warning condition by a combination of the warning-of answer time and the warning-correct answer percentage, when the second determination determines that the correct answer percentage does not correspond to the warning-of correct answer percentage; and conducting a first progress state display, which displays the progress state indicating the answer time and the correct/incorrect answer determination result for each of the problems for each of the students based on the student answer information, when the third determination determines that the predetermined condition values are not satisfied.

2. The question setting apparatus as claimed in claim 1, wherein the processing of the progress display further includes conducting a second progress state display when the first determination determines that the percentage of the students is more than the predetermined value, by acquiring the answer time and the correct/incorrect answer determination result for each of the students with respect to the problem in which the answer time corresponds to the warning-of answer time, from the student answer information, and displaying the progress state, which indicates the answer time and the correct/incorrect answer determination time for each of the students, at the display device.

3. The question setting apparatus as claimed in claim 2, wherein the processing of the progress display further includes conducting a third progress state display when the second determination determines that the correct answer percentage corresponds to the warning-of correct answer percentage, by acquiring the correct/incorrect answer determination result and the answer time for each of the students with respect to the problem in which the correct answer percentage corresponds to the warning-of correct answer percentage from the student answer information; and displaying the progress state, which indicates the correct/incorrect answer determination result and the answer time for each of the students at the display device.

4. The question setting apparatus as claimed in claim 3, wherein the processing of the progress display includes conducting a fourth progress state display when the third determination determines that the predetermined condition values are satisfied, by acquiring the correct/incorrect answer determination result and the answer time for each of the students with respect to the problem in which the predetermined condition values are satisfied, from the student answer information; and displaying the progress state, which indicates the correct/incorrect answer determination result and the answer time for each of the students, at the display device.

5. The question setting apparatus as claimed in claim 1, wherein the processing of the progress display includes determining whether an answer has been recorded for the problem included in the answer data in the student answer information when the answer data are received in the given time of the test;

adding the answer time recorded in the student answer information and the answer time included in the answer data when the determining determines that the answer has been recorded for the problem; and recording the answer data so as to record the answer time in which the answer time recorded in the student answer information is added in the student answer information.

6. A question setting method, performed in a computer, the method comprising:

receiving, by the computer, a problem included in a test and answer data pertinent to an answer with respect to the problem in a given time for a specific test, from multiple student terminals connected through a network;

recording, by the computer, the answer data, which is received in a student answer database that maintains the answer data pertinent to the answer with respect to the problem;

displaying, by the computer, a progress state at a display device by using the student answer database in the given time of the test, the progress state indicating an answer state of problem data based on a correct/incorrect answer determination with respect to the answer data received from the multiple students; and sending, by the computer, a display instruction, which is input at an input device which a teacher uses based on the progress state displayed at the display device and causes the specific test to stop, to the multiple student terminals, wherein the answer data include an answer time of a student, and the displaying of the progress state further includes conducting a first determination, which determines whether a percentage of students, in which the answer time reaches a warning-of answer time for warning of an end of the test, is more than a predetermined value;

conducting a second determination, which determines whether a correct answer percentage corresponds to a warning-of correct answer percentage for warning of the end of the tests, when the first determination determines that the percentage of the students is not more than the predetermined value;

conducting a third determination, which determines whether a percentage of students, who spent the answer time corresponding to the warning-of answer time, and the correct answer percentage corresponding to the warning-of correct answer percentage satisfy predetermined condition values, with respect to a problem corresponding to a warning condition by a combination of the warning-of answer time and the warning-correct answer percentage, when the second determination determines that the correct answer percentage does not correspond to the warning-of correct answer percentage; and displaying the progress state, which indicates the answer time and the correct/incorrect answer determination result for each of the problems for each of the students based on the student answer information, when the third determination determines that the predetermined condition values are not satisfied.

* * * * *